(12) United States Patent
McLeish et al.

(10) Patent No.: US 8,305,440 B2
(45) Date of Patent: Nov. 6, 2012

(54) STATIONARY OBJECT DETECTION USING MULTI-MODE BACKGROUND MODELLING

(75) Inventors: David Grant McLeish, Northmead (AU); Jarrad Michael Springett, North Bondi (AU)

(73) Assignee: Canon Kabushiki Kaisha, Tokyo (JP)

( * ) Notice: Subject to any disclaimer, the term of this patent is extended or adjusted under 35 U.S.C. 154(b) by 924 days.

(21) Appl. No.: 12/394,289

(22) Filed: Feb. 27, 2009

(65) Prior Publication Data

US 2009/0290020 A1 Nov. 26, 2009

(30) Foreign Application Priority Data

Feb. 28, 2008 (AU) .................................. 2008200966

(51) Int. Cl.
*H04N 7/18* (2006.01)
(52) U.S. Cl. ........................................ 348/143; 382/102
(58) Field of Classification Search .................. 348/143; 382/103
See application file for complete search history.

(56) References Cited

U.S. PATENT DOCUMENTS

| | | | | |
|---|---|---|---|---|
| 5,822,542 | A | 10/1998 | Smith et al. ................... 709/247 |
| 6,999,600 | B2 | 2/2006 | Venetianer et al. ........... 382/103 |
| 7,962,435 | B2 * | 6/2011 | Yu et al. .......................... 706/47 |
| 8,050,457 | B2 * | 11/2011 | Kameyama ................... 382/103 |
| 2004/0233283 | A1 | 11/2004 | Kang et al. |
| 2004/0246336 | A1 | 12/2004 | Kelly, III et al. |
| 2005/0162515 | A1 | 7/2005 | Venetianer et al. |
| 2008/0031493 | A1 | 2/2008 | Brogren et al. |
| 2009/0060278 | A1 * | 3/2009 | Hassan-Shafique et al. . 382/103 |
| 2009/0074246 | A1 * | 3/2009 | Distante et al. ............... 382/103 |
| 2009/0141940 | A1 * | 6/2009 | Zhao et al. .................... 382/103 |

FOREIGN PATENT DOCUMENTS

WO    2006097681 A1    9/2006

OTHER PUBLICATIONS

Li et al. Foreground Object Detection from Videos Containing Complex Background. ACM. 2003.*

* cited by examiner

*Primary Examiner* — Lynn Feild
*Assistant Examiner* — Bryan Lee
(74) *Attorney, Agent, or Firm* — Fitzpatrick, Cella, Harper & Scinto

(57) ABSTRACT

Disclosed is a method 1201 of processing a video stream, the method comprising the steps of determining 1230 a representative age measure from a model for a visual element from the video stream, determining 1250 a representative activity count measure from the model, establishing a functional relationship between the representative activity count measure and the representative age measure, comparing 1240 the functional relationship to a threshold value, and determining 1260 if the visual element is stationary, based on the result of the comparing step.

10 Claims, 15 Drawing Sheets

STATIONARY OBJECT DETECTION USING MULTI-MODE BACKGROUND MODELLING

FIELD OF THE INVENTION

The current invention relates generally to video processing and, in particular, to the detection of stationary foreground objects in video, or the removal of objects from video that were previously considered background.

BACKGROUND

Video cameras, such as Pan-Tilt-Zoom (PTZ) cameras, are omnipresent nowadays, mostly for surveillance purposes. The cameras capture more data (video content) than human viewers can typically process. Automatic analysis of video content is therefore often needed.

An essential step in the automatic processing of video content is the segmentation of video data into foreground objects and a background scene, or background. Such segmentation allows for further analysis, such as detection of specific foreground objects, or tracking of moving objects. Such further analysis may, for example, result in sending an alert to a security guard.

Two further goals of such analysis are of particular interest. First is the detection of abandoned objects, that is objects such as items of luggage that have been brought into the scene being monitored and left there. Second is the detection of object removal, that is noticing that an object that was previously considered part of the background has been taken out of the scene.

A common approach to foreground/background segmentation is background subtraction. For example, the median pixel value for a position in a scene may be compared against the current pixel value at that position. If the current pixel value is similar to the median pixel value, the pixel is considered to be belonging to the background, otherwise the pixel is considered to be belonging to a foreground object.

Using a background subtraction approach, abandoned object events and object removal events have similar properties. Both appear as a region where the scene is different to the "remembered background", but is otherwise not changing. This is the case whether the "remembered background" is represented by a reference frame created when the system is initialised, by a collection of stored mode models corresponding to visual elements in the scene, or by some other means. It is often advantageous to use a common technique to detect when either of these events have occurred, and possibly raise an alert.

There are several challenges for such approaches. One is to make the approach robust to temporary occlusion of the object, for example if someone walks in front of an abandoned item of luggage. Another is to distinguish truly stationary objects from objects that are moving slowly or intermittently. Many techniques are able to handle one of these cases but not the other—the more sensitive a system is to changes in a slowly moving object, the more likely it is to lose track of a stationary object due to occlusion or noise, and vice versa.

SUMMARY

It is an object of the present invention to substantially overcome, or at least ameliorate, one or more disadvantages of existing arrangements.

Disclosed are arrangements, referred to as Multi-mode Background Modelling (MMBM) arrangements, which use the "age" and "activity count" of parts of the video scene, having regard to mode models for the scene, in conjunction with appropriate thresholds, to determine whether objects are stationary.

For each block in a frame (part of a video stream), several mode models are maintained that represent the content at that point in space over a history of many frames. For each mode model, a record is kept of how often the model is active, i.e. the number of frames in which it corresponded to the appearance an input frame (this being referred to as the "activity count" of the mode model). The record also includes a measure of when the mode was first created (this being referred to as the "age" of the mode model). A "blob", consisting of several blocks, has a representative activity count and age that can be derived from the activity count and age of the blocks of which the blob is composed, using for example the median or mean value of the respective parameters of the constituent blocks.

In one MMBM arrangement, a blob is considered to be stationary if the age of the blob is greater than a first predetermined threshold, and the ratio of the activity count of the blob to the age of the blob is greater than another predetermined threshold.

The MMBM approach uses the parameter values calculated during multi-mode background modelling (e.g. mixture of Gaussians, or the SABMM approach described in this description) to decide whether an object is stationary, and specifically, this is done using the age and activity count parameters.

According to a first aspect of the present invention, there is provided a method of processing a video stream, said method comprising the steps of:

determining a representative age measure from a model for a visual element from the video stream;

determining a representative activity count measure from the model;

establishing a functional relationship between the representative activity count measure and the representative age measure;

comparing the functional relationship to a threshold value; and determining if the visual element is stationary, based on the result of the comparing step.

Other aspects of the invention are also disclosed.

BRIEF DESCRIPTION OF THE DRAWINGS

One or more embodiments of the invention will now be described with reference to the following drawings, in which.

DETAILED DESCRIPTION INCLUDING BEST MODE

Figure 1:
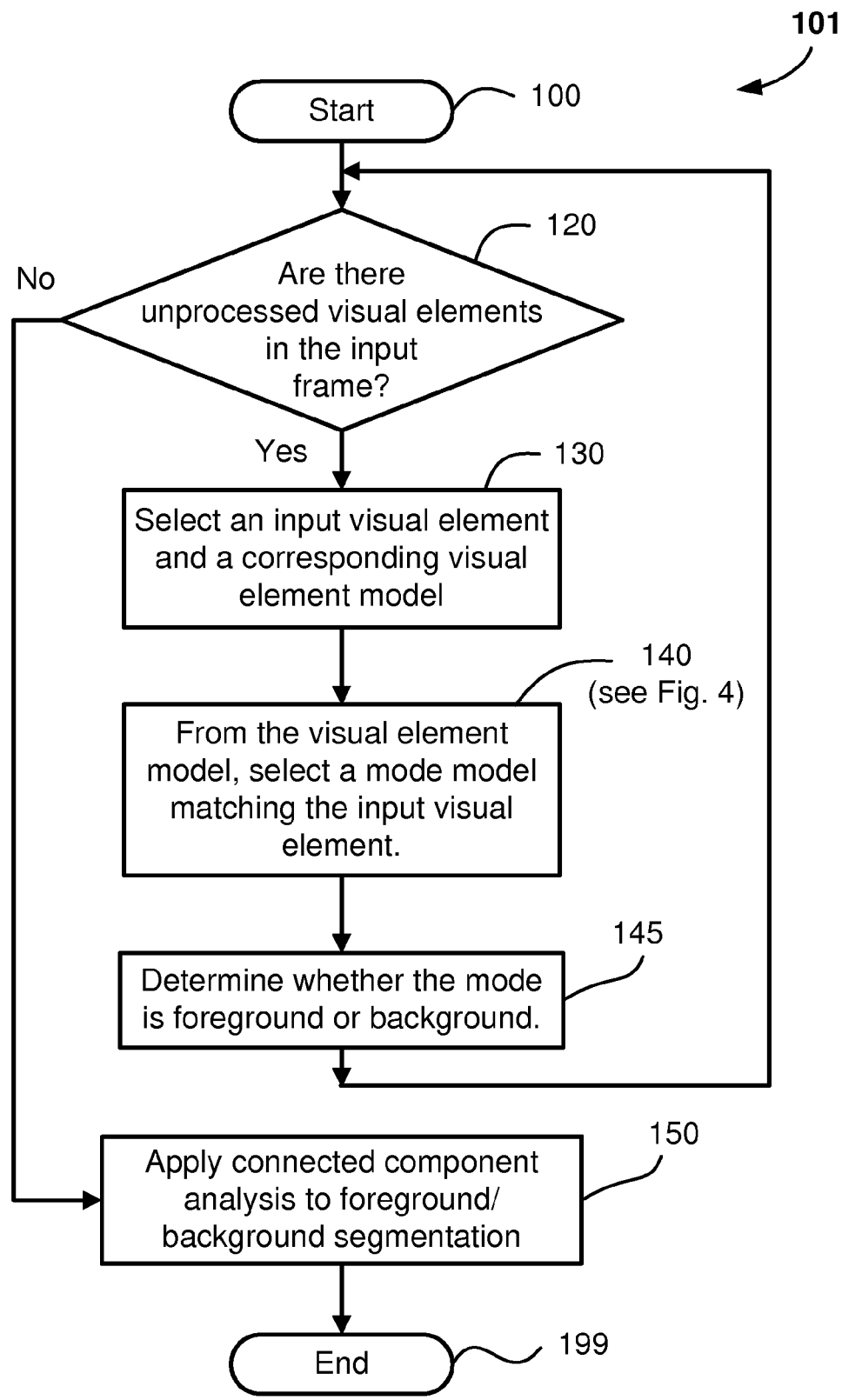
FIG. 1 is a flow chart of a foreground/background separation data process.

Where reference is made in any one or more of the accompanying drawings to steps and/or features, which have the same reference numerals, those steps and/or features have for the purposes of this description the same function(s) or operation(s), unless the contrary intention appears.

It is to be noted that discussions relating to prior art arrangements relate to devices which may form public knowledge through their use. Such discussions should not be interpreted as a representation by the present inventors or patent applicant that such devices in any way form part of the common general knowledge in the art.

In relation to multi-mode background modelling, arrangements referred to as Spatio-activity based mode matching (SABMM) arrangements are described herein which maintain, for each block in a frame (part of a video stream), several mode models that represent the content at that point (also referred to as a location or a locale) in the scene in question over a history of many frames. For each mode model, a record is kept of how often the model is active, i.e. how often the model is applicable to an input frame. Similarity in activity for spatially neighbouring blocks (eg the 4-connected neighbouring blocks of the block in question) is taken into account to determine the active mode for a block in a new input frame. A temporal characteristic is thus used for determining supporting evidence amongst spatially neighbouring blocks instead of visual characteristics.

Mode Model Matching Introduction

A camera may be used to capture video frames representing the visual content of a scene appearing in the field of view of the camera. In the case of a pan-tilt camera, the orientation of the camera may be altered to change the field of view. The camera may therefore capture video frames of a scene, with the scene being larger than the field of view of the camera.

Figure 8:
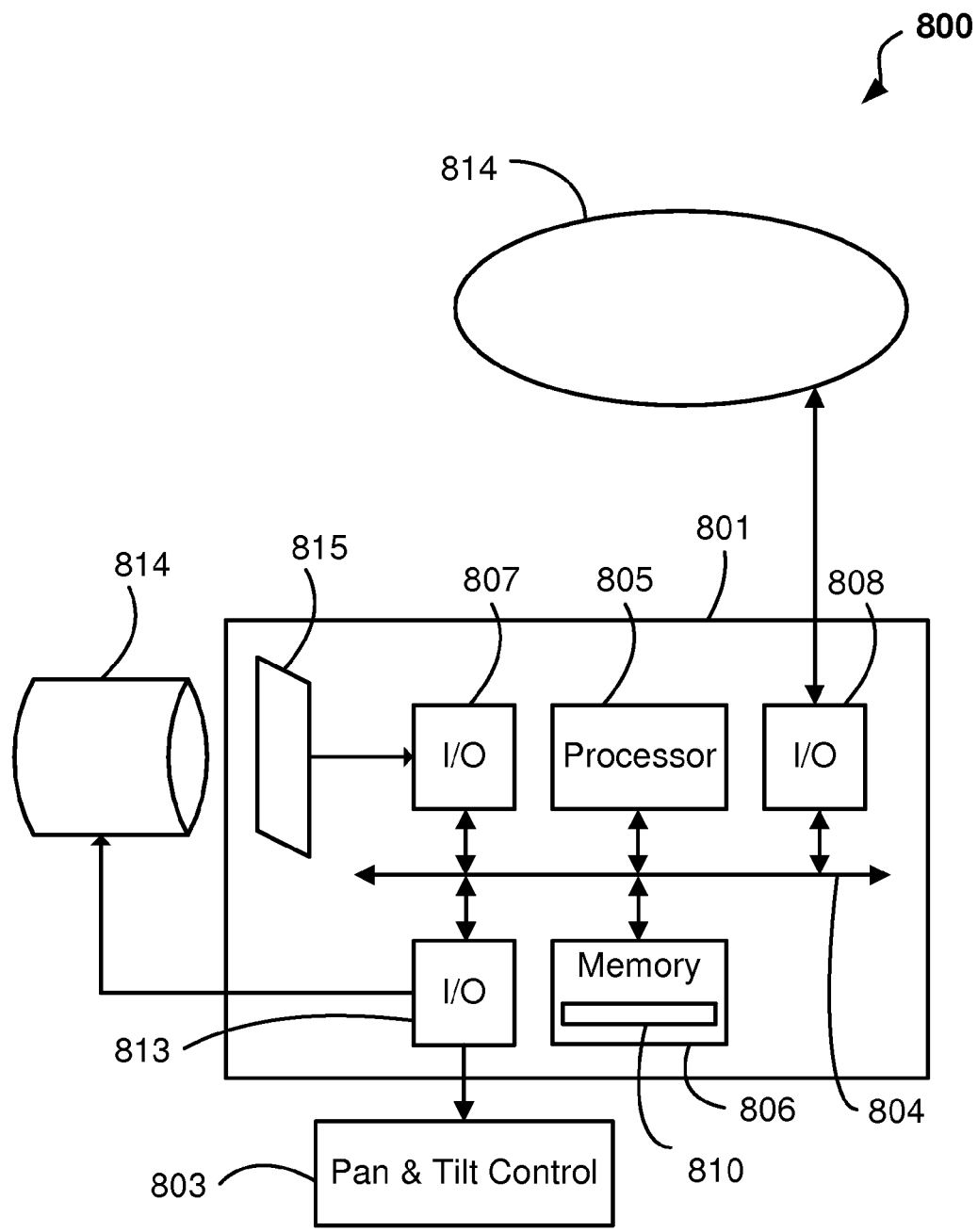
FIG. 8 shows a schematic block diagram of a camera upon which the methods of FIGS. 1 and 4-7 may be practiced.

FIG. 8 shows a functional block diagram of a camera 800 upon which the SABMM arrangements may be practised. The camera 800 is a pan-tilt-zoom camera (PTZ) comprising a camera module 801, a pan and tilt module 803, and a lens system 814. The camera module 801 typically includes at least one processor unit 805, and a memory unit 806, a photo-sensitive sensor array 815, an input/output (I/O) interface 807 that couples to the sensor array 815, an input/output (I/O) interface 808 that couples to a communications network 814, and an interface 813 for the pan and tilt module 803 and the lens system 814. The components 807, 805, 808, 813 and 806 of the camera module 801 typically communicate via an interconnected bus 804 and in a manner which results in a conventional mode of operation known to those in the relevant art.

Each frame captured by the camera 800 comprises more than one visual element. A visual element may be defined as an image sample. In one SABMM arrangement the visual element is a pixel, such as a Red-Green-Blue (RGB) pixel. In another embodiment each visual element comprises a group of pixels. In yet another embodiment the visual element is an 8 by 8 block of transform coefficients, such as Discrete Cosine Transform (DCT) coefficients as acquired by decoding a motion-JPEG frame, or Discrete Wavelet Transformation (DWT) coefficients as used in the JPEG-2000 standard. The colour model is typically YUV, where the Y component represents the luminance, and the U and V represent the chrominance.

Separation of the visual elements appearing in video frames into foreground objects and background may be achieved by comparing the captured input visual elements at a point in time to corresponding visual elements at the same locale in the scene, but captured at different points in time.

Foreground/background separation can be performed on frames, or regions in frames. Such regions may have been identified using knowledge about the domain (ie knowledge about the environment in which the SABMM system is operating). For example, to save processing power and energy consumption, a user may specify that no foreground/background separation is to be performed on a particular part of the scene. The reason for such an exclusion may be that a part of the scene (where foreground/background separation is to be performed) is a restricted area and thus requires foreground/background and other processing, while the other part (where foreground/background separation is not to be performed) is public space and thus of no interest.

A background model is used to represent the visual elements within the scene captured at different points in time. The background model is a representation of the non-transient parts visible in the scene. Accordingly, the background model describes a scene containing no foreground objects. In a simple case, a first frame may be used as the background model. If the frame contains no foreground objects, that first frame is an accurate background model as that first frame is a representation of the non-transient parts visible in the scene. However, using the first frame as the background model is not robust against gradual changes within the scene, or against illumination effects. Also, the assumption that the first frame contains no foreground objects is generally not realistic. In the case of pan-tilt cameras, the first frame also does not cover the entire scene.

A better approach to modelling the background is to use a statistical function of the data that represents the scene. In one SABMM embodiment, fixed values that are derived from a statistical function of the frame data, such as the mean or median of the data, are used to construct the background model. Accordingly, a visual element in the background model may have a fixed value of R=100, G=150, B=200, or luminance=123.45, or transform coefficients $\{-50, 28, 76, 38\}$.

The individual values for the channels or coefficients in the background model may be computed individually. That is, the total representation of the visual element in the background model does not necessarily relate to any one specific visual element in the history used as input to the statistical function.

In another SABMM embodiment, a distribution is computed for each visual element in the background model. For example, the mean of the colour channels or of the transform coefficients may be used, together with a standard deviation of the same. This allows for a more dynamic interpretation of a visual element, because an observed value different to, but sufficiently similar to the mean may be considered to belong to the background model. In yet another SABMM embodiment, the background can be multi-modal. Consider the case of an elevator light which may be on or off. In such a case a mean/standard deviation pair is used to represent the "on" state of the light, and another pair is used to represent the "off" state of the light.

In yet another SABMM embodiment, a filter may be applied to the incoming data to actively maintain different distributions in different modes. For example, prior knowledge of a bright flashing light in a scene can be used to deliberately maintain separate states for when the light is on and for when the light is off, thus constructing models with better statistical coherence than would be modelled otherwise. Alternatively, this filtering process can result in some data which is excluded from being modelled entirely. For example, considering the same case of the flashing light, and presuming that the flashing behaviour is rare, and differs in some way which makes its impact on the scene inconsistent, e.g. location or colour. In such a case, affected frames can be detected, and it is known in advance that those frames are irrelevant and non-repetitive, so they are excluded from the modelling process entirely.

In all cases the background is modelled, but with different visual characteristics. In yet another SABMM embodiment, all visual content (including foreground) is modelled into the background model, and it is decided later, based on this background model, which visual elements are considered to represent foreground objects, and which content is considered to represent the background. The standard deviation of each distribution may for example be used to make this decision, with visual elements having a standard deviation greater than a threshold considered to represent foreground objects. The remainder of the visual elements are then considered to represent the background.

Scene Model.

Figure 2:
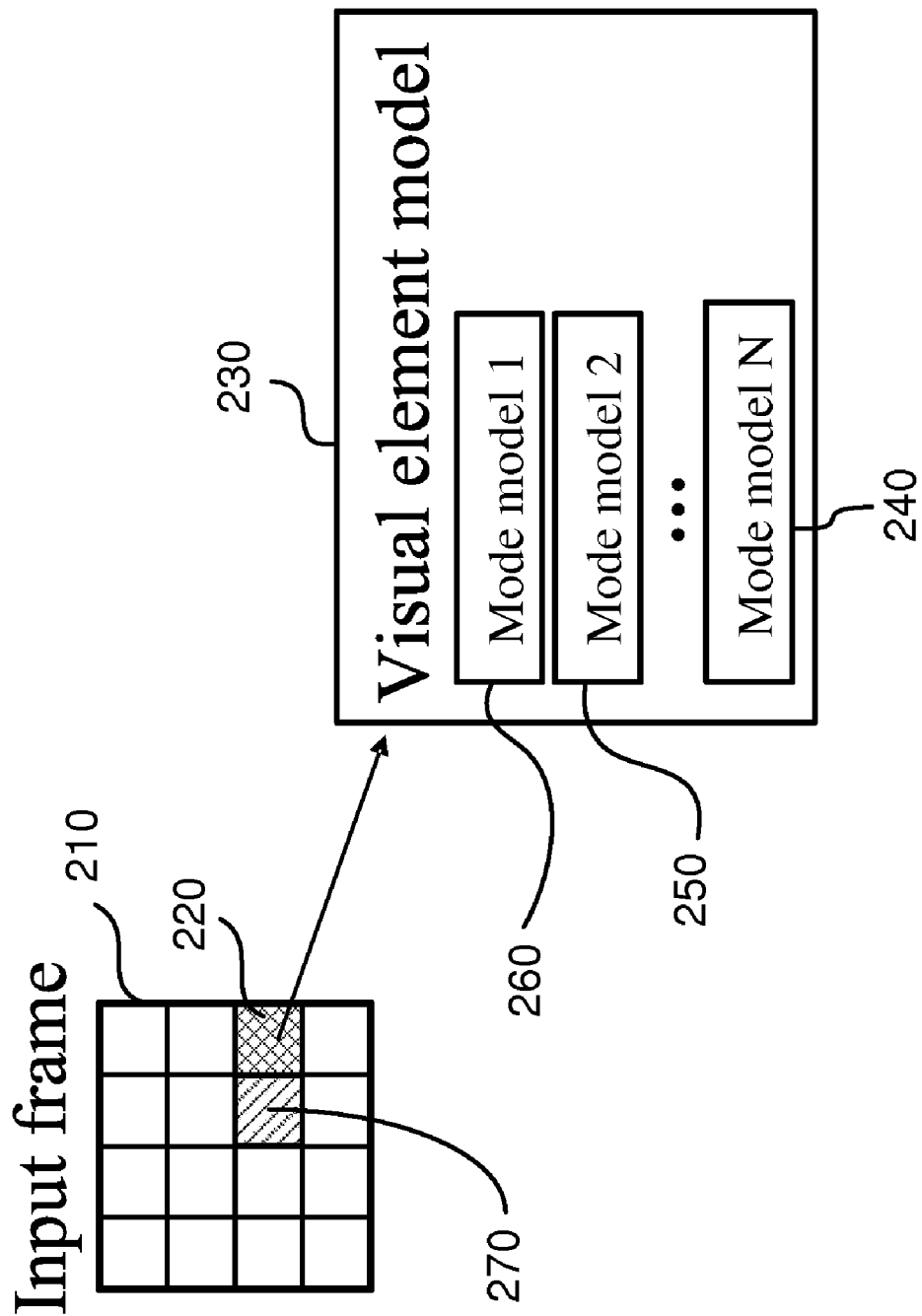
FIG. 2 depicts data stored in memory according to one SABMM arrangement.

FIG. 2 depicts data stored in memory according to one SABMM arrangement. As previously noted, a PTZ camera may cover a scene whose extent is larger than the field of view of the camera, this field of view corresponding to the input frame. For ease of understanding, unless otherwise stated, descriptions relating to an input frame relate to the case in which the scene being considered is the same as the field of view of the camera, and accordingly the input frame captures the entire scene in question. The SABMM approach is not however limited to this restricted case.

An input frame 210 consists of several visual elements such as 220. The visual element 220 is the elementary unit at which processing takes place, and may, for example, be a pixel or an 8×8 DCT block. The visual element 220 is captured by an image sensor such as 815 in the camera 800.

For each input visual element 220 that is modelled, a visual element model 230 is maintained. The visual element model 230 consists of one or more mode models such as 240. Each mode model 240 is based on a time history of values for the visual element 220. There can be several mode models 240 corresponding to the same location in the captured input frame 210. For example, if there is a flashing neon light, one mode model 240 may represent "background—light on", another mode model 250 may represent "background—light off", and yet another mode model 260 may represent "foreground" such as part of a passing car.

In one SABMM arrangement, different mode models such as 240 in a particular visual element model such as 230 may be based upon different attributes of the corresponding visual element 220. Thus in one arrangement one or more of the mode models for the visual element 220 are based upon the mean values of pixel intensity values for the visual element 220. In another arrangement, one or more of the mode models for the visual element 220 are based upon the median or the approximated median of observed DCT coefficient values for each DCT coefficient for the visual element 220, and the mode models for the visual element 220 record temporal characteristics of the visual element 220.

Figure 4:
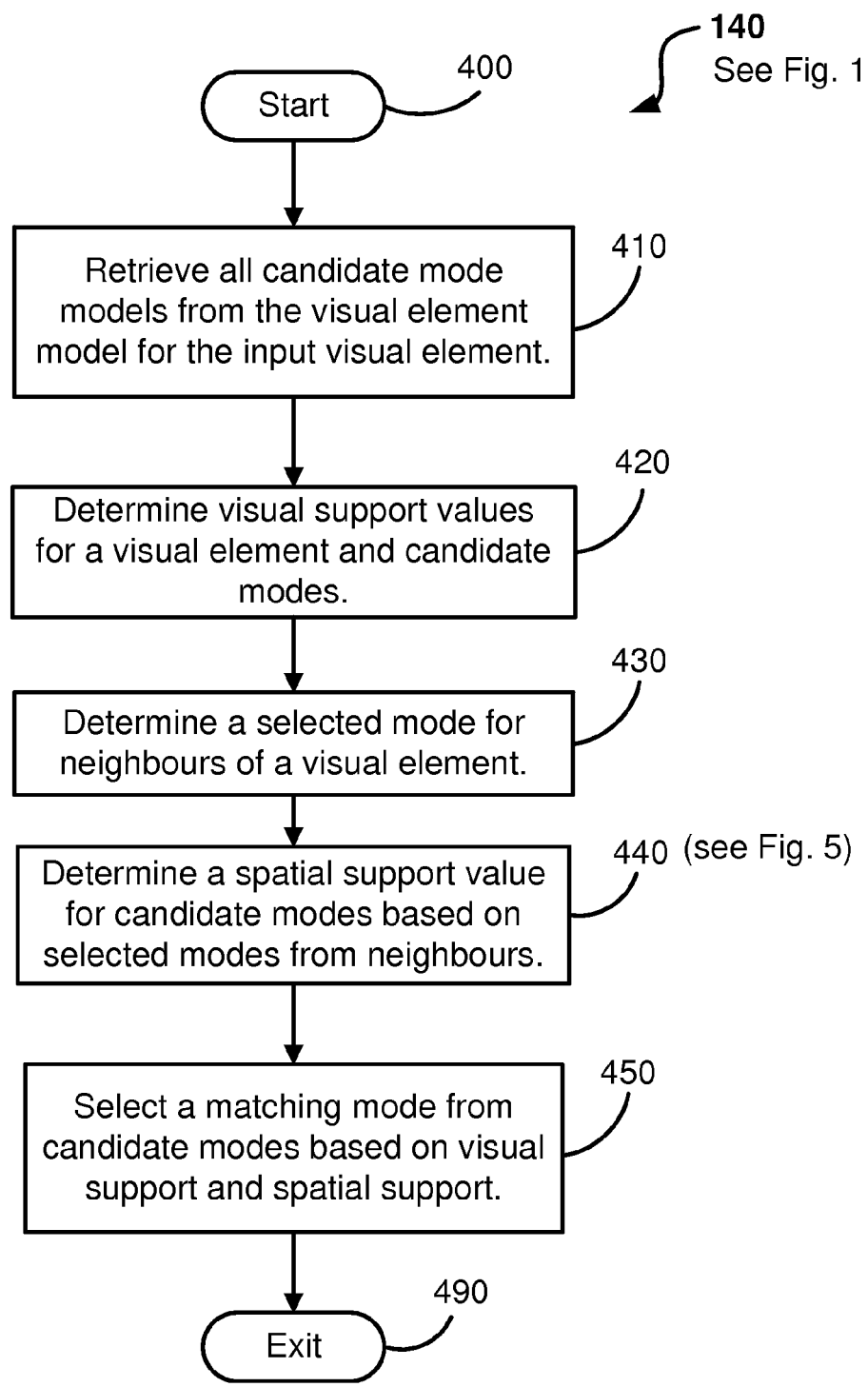
FIG. 4 is a flow diagram illustrating a method of mode matching.

Examples of temporal characteristics are (a) activity count (ie the number of times the mode model in question has been considered to be applicable or representative for the input visual element 220 (ie the number of times the mode model is found to match the visual element in question according to a step 140 in FIG. 1 or a step 450 in FIG. 4), which usually corresponds to the number of times the mode model in question was updated), (b) creation time (ie the time stamp or frame number corresponding to the creation of the mode model), or (c) reappearance time (ie the last time the mode model was found not to be representative for the input visual element 220). In an arrangement referred to as the "Mixture of Gaussians" approach, the mode model consists of a mean and standard deviation for each of the three colour channels (R, G, and B) in a pixel in the visual element 220 and a weighted sum of all the times the mode model matched the input pixel. In general the term "temporal characteristic" as applied to mode models relate to aggregate types of information such as activity type.

General Approach to Foreground Segmentation.

FIG. 1 is a flow chart of a foreground/background separation (segmentation) data process 101 used in some SABMM arrangements. The segmentation process 101 starts at a step 100 with an input frame such as 210 (see FIG. 2) captured by the lens 814 and the image sensor 815 in the camera 800 (see FIG. 8). In a following step 120 the processor 805 performs a check to determine whether any visual elements such as 220, such as pixels or blocks, have not yet been processed. If there are no more visual elements such as 220 to be processed, the segmentation process 101 is complete at the visual element level and is directed by a NO arrow from the step 120 to a post-processing step 150 in which the processor 805 may perform connected component analysis on the segmentation results using standard techniques such as flood fill. For example, small connected components may be removed. After that, the process 101 is directed to an END step 199 which completes the processing with respect to the input frame in question. The process 101 can be repeated for other frames in the sequence.

Returning to the step 120, if there are more visual elements such as 220 to be processed, the process 101 is directed from the step 120 by a YES arrow to a step 130 in which the processor 805 selects another visual element such as 220 for SABMM processing, and the corresponding visual element model 230 is found (ie retrieved from the memory 806 where is has been stored). In a following step 140 (see FIG. 4 for more detail) the visual element 220 from the input frame 210 is compared by the processor 805 against the mode models such as 240 in the visual element model 230 in order to select a matching mode, as is discussed in more detail below. The process performed in the step 140 is referred to as the "mode matching" process).

In a following step 145 the processor 805 then determines, for the matching mode determined in the step 140, whether the visual element in question 220 represents foreground or background. Depending on the type of background model, the model of the matching mode is usually updated (not shown) for the value of the input visual element. Next, the process 101 is directed from the step 145 to the step 120 and more visual elements are processed.

Selecting a Matching Mode (See the Step 140 in FIG. 1)

There are various ways to select a matching mode by the step 140 in the process 101 in FIG. 1. In one SABMM arrangement, all the mode models 240 in the visual element model in question such as 230 are compared to the input visual element 220, and the mode model with the highest similarity is selected as a matching mode.

In another SABMM arrangement, a threshold value is used to determine if there is an acceptable match, and once the first mode model satisfying the threshold is found, there is no need to compare further mode models. In one example a mode model match is determined if the input value of the visual element 220 is within 2.5 standard deviations of the mean of the mode model in question. This arrangement is useful when computing a similarity is an expensive operation.

In yet another SABMM arrangement, more than one match criterion may be used to obtain more than one type of match, and the match type may be used to determine a later process or mode for a process to act upon. For example, separate matches may be made for an intensity pattern match, and for an overall brightness match.

An important issue in the above-noted processes for selecting the matching mode in the step 140 relates to computing similarity. For simple background mode models, such as those based upon mean intensity, the computation of similarity is straightforward. However for more complex background models determining similarity is not trivial. For example, when the visual element ss0 is an 8×8 block with DCT coefficients, similarity needs to be defined over multiple dimensions. In one SABMM arrangement, machine learning techniques, such as Support Vector Machines and Naïve Bayes classifiers, are used to map multi-dimensional input image values from the visual element 220 to one probability value, indicating the probability that a particular mode model such as 240 matches the input visual element 220 in question.

The problem of selecting, in the step 140 in FIG. 1, a matching mode model is now reduced to interpreting the above-noted probability value. One arrangement for interpreting the probability value is to threshold probability values to determine a mode match. In an alternative arrangement, a mode match is based not only on the matching characteristics of one visual element but also on the characteristics of neighbouring visual elements and corresponding visual element models as described below.

Determining Whether a Mode is Foreground (See the Step 145 in FIG. 2).

When a mode model such as 240 is matched to the corresponding input visual element 220, it needs to be determined whether the mode model is foreground or background or any other set category. In general, foreground/background determination is done by evaluating the temporal characteristics of the mode model. If a mode model has been sufficiently persistent over time, it is assumed that it represents the background. If a mode model has been around for a short period only, it is assumed it is associated with a non-persistent foreground object. By using multiple mode models (eg 240, 250 and 260 in FIG. 2), there can be several background mode models. For example, if there is a flashing neon light, one mode model represents "light on", a second mode model "light off" and a third mode model "passing car occluding the neon light".

In one SABMM arrangement, a visual element such as 220 is considered to be a foreground object if the matching mode model was created a certain number of frames, say 1000, or seconds, say 200, ago. In another SABMM arrangement, a visual element 220 is considered to be a foreground object if the matching mode model has been selected more times than a threshold value.

Using Temporal Characteristics of Spatially Neighbouring Visual Elements

A mode match (ie the step 140 in the process 101 in FIG. 2 which seeks a match between the visual element 220 and one of the mode models such as 240 in the corresponding visual element model 230) that is based purely on the information in the visual element 220 is sensitive to noise. Noise can be reduced by taking into account the context, i.e. spatially neighbouring visual elements such as 270 (see FIG. 2).

The goal of object detection is to find objects that are made up of multiple visual elements such as 220. Therefore, when one visual element is found to be foreground, it is reasonable to expect that there are other foreground visual elements in the neighborhood. If there are none, it is possible that the visual element should not be determined to be foreground.

Visual elements such as 220 and 270 that are part of the same object are not necessarily visually similar. However, they are likely to have similar temporal characteristics. For example, if the object is moving, all visual elements associated with the object will have been visible for a short period only. In contrast, if the object is stationary, all visual elements associated with the object will have been modelled for a similar, longer period.

The SABMM approach makes use of the similarity in temporal characteristics of mode models to match modes (ie to select the appropriate mode model for the visual element in question in the step 140 in FIG. 1). This is described with reference to FIG. 3 (which depicts the relationships between data used in the SABMM approach), FIG. 4 (which depicts an overview of the process used), and FIG. 5 (which shows, in mode detail, the step 440 in FIG. 4).

Figure 3:
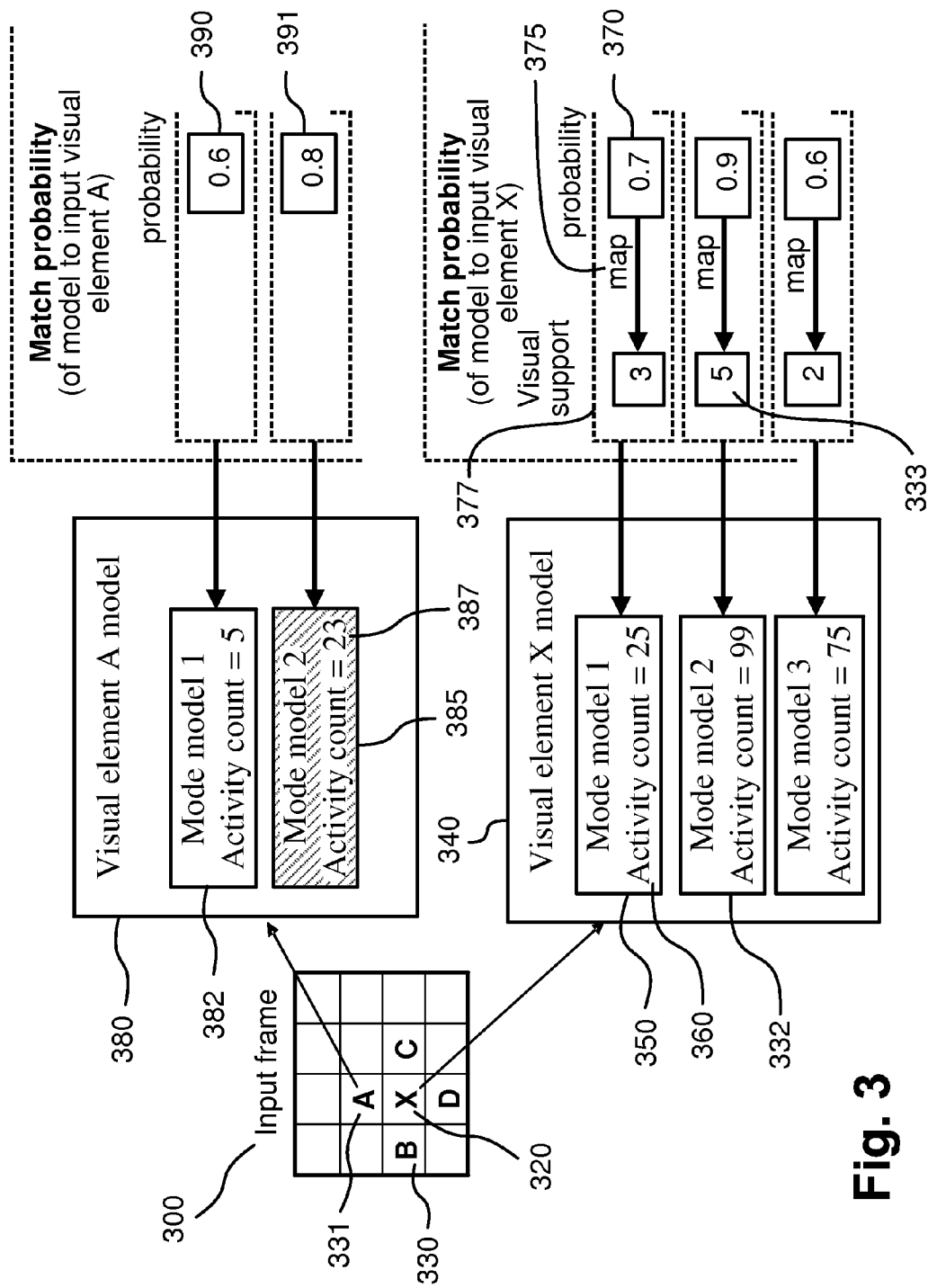
FIG. 3 depicts data used to make mode matching decisions.

FIG. 3 depicts data used to make mode matching decisions. The approach in FIG. 3 is described in relation to an input visual element 320 in a current input frame 300. FIG. 4 is a flow diagram illustrating a method 140 (see FIG. 1) of mode matching which is described in relation to FIG. 3. The process 140 in FIG. 4 should be considered in the context of the data relationships depicted in FIG. 3.

In FIG. 3, a visual element "X" (having an associated reference numeral 320) is depicted as having four neighbouring visual elements "A", "B", "C" and "D". For each visual element 320, and having regard to FIG. 4, the process 140 starts with a start step 400 after which the processor 805 retrieves, in a step 410, all candidate mode models such as 350 from the corresponding visual element model 340 associated with the input visual element 320.

As noted a mode model such as 350 represents the visual content of the corresponding visual element 320 over a history of many frames 300. As further noted multi-dimensional input values from the visual element 320 can be mapped to a single probability value 370 indicating the probability that the corresponding mode model 350 matches the input visual element 320 in question. These probability values such as 370 can be mapped, as depicted by an arrow 375, to corresponding visual support values such as 377 in a number of different ways.

Accordingly, in a next step 420 the processor 805 determines from the probability values such as 370, corresponding visual support values such as 377 for the candidate mode models selected in the step 410. In general, the visual support value 377 is an indication of the visual similarity between the visual element 320 in question and the mode model 350.

In one arrangement, the probability of matching 370 is used directly as the corresponding visual support value 377. In another arrangement, a fixed point approximation of the probability of matching 370 is used as the visual support 377 value. For example, the probability of matching 370 value is between 0 and 1, and this can be multiplied with a fixed point number say 2048, and the result rounded to the nearest integer. In another example, the probability of matching 370 value is a fixed point value between 0 and 4096, and it is shifted right to result in a corresponding visual support 377 value between 0 and 2048.

Accordingly, the visual support values such as 377 are derived from the corresponding probabilities of matching 370, which are computed for each candidate mode model 350 in the corresponding visual element model 340. These probabilities 370 are mapped 375 to corresponding visual support value 377. For example, the following mappings 375 may be used:

| Probability | Visual support value |
|---|---|
| 0.0-0.1 | 0 |
| 0.1-0.4 | 1 |
| 0.4-0.6 | 2 |
| 0.6-0.9 | 3 |
| 0.9-1.0 | 4 |

After computing visual support values such as 377 for corresponding candidate mode models such as 350 in the step 420, the processor 805 determines, in a step 430, a selected mode model for neighbours of the visual element in question 320. This step 430 can, for example, be performed by selecting the mode model 332 which is seen to have the highest visual support value 333.

In a following step 440 (see FIG. 5 for more detail), the processor 805 determines a spatial support value for each of the candidate modes selected in the step 410 for the visual element 320 in question. In general, spatial support is a measure of the extent to which one or more neighbouring visual elements have one or more associated mode models which have similar temporal characteristics to one or more mode models of the visual element in question. Thus for example the visual element 331, which is a neighbouring visual element of the visual element 320 in question, is considered to provide spatial support to a candidate mode model 350 of the visual element 320 in question if one of the mode models 385 of the neighbouring visual element 331 has a similar temporal characteristic 387 to a temporal characteristic 360 of the mode model 350.

In one arrangement, mode models of each of the 4-connected neighbours "A", "B", "C" and "D" of the visual element "X" (ie 320) is compared to each of the candidate mode models such as 350 in the visual element model 340 to check if a neighbour such as 330 provides spatial support. Spatial support is determined based on temporal information such as 387.

Mode models 350, 385 record information about their respective temporal characteristics 360, 387.

In one arrangement, the temporal characteristic 360, 387 is an activity count which is computed as follows. When new mode models 350, 385 are first created for their respective visual elements "X" (ie 320) and "A" (ie 331), the respective activity counts 360, 387 are set to 1. After that, each time that mode models 350, 385 are selected as a match to the corresponding input visual elements "X" and "A", the activity counts 360, 387 of the respective mode models 350, 385 is incremented by 1.

If visual elements 320, 331 belong to the same visual object, the visual elements 320 and 321 will typically have mode models 350, 385 which have similar activity counts 360, 387.

A visual element 331, which is a neighbouring visual element of the visual element 320 in question, is considered to provide spatial support to a candidate mode model 350 of the visual element 320 in question if one of the mode models 385 of the neighbouring visual element 331 has a similar temporal characteristic 387 to a temporal characteristic 360 of the mode model 350.

In one arrangement, the activity counts 360 and 387 (having respective values 25, 23) are considered to be similar if the difference between their values is smaller than a predetermined threshold, say 5 (in the present example the activity counts differ by "2" and are thus similar). In another arrangement, the difference is capped. That is, if both activity counts 360 and 387 have a value greater than a threshold, say 100, they are considered to be similar.

The difference computation may be done using other temporal characteristics in the same fashion as described above for the activity count temporal characteristic. For example, in another arrangement, the temporal characteristic used is the creation time instead of activity count. In yet another arrangement, the temporal characteristic used is the reappearance time (which is the last time when the mode switched from inactive (not matched) to active (matched), that is: the start of a sequence of matches for the modes). For practical reasons, this may be implemented as the last time the mode was not matched. Updating of the reappearance time may include a noise filter. That is, the reappearance time may be reset to the current time only if the mode was not matched for at least a number of times, say 3.

The step 440 determines spatial support values for at least some of the mode models of the visual element in question the spatial support values being provided by at least some of the mode models of other visual elements that are typically in the vicinity of, or indeed are immediate neighbours of, the visual element in question.

In one arrangement, all candidate mode models such as 350 in the visual element model 340 for the visual element 320 are compared to the single mode model 385 in the visual element model 380 associated with the neighbouring visual element 331 after determining that the mode model 385 is a "match" in the step 430. In this arrangement the mode model 385 is selected from all mode models in the visual element model 380 based on the similarity value 391 of the mode model 385. The matching process 430 can be applied in multiple passes over the input frame 300. In further passes, a mode model match can be made that is different from the initial selection 385 based on visual similarity 391 according to the method described below. Another mode model 382 may then be chosen as the selected mode model for temporal comparison with the candidate mode models 350.

Returning to the process 140 in FIG. 4, following the step 440 the processor 805 selects (ie identifies) a matching mode such as 350 for the visual element "X" (ie 320) in question, from the other candidate mode models such as 332 in the visual element model 340 based upon (a) the visual support values determined in the step 420, and (b) the spatial support values determined in the step 440. The step 450 thus completes the SABMM mode matching process referred to in the step 140 in FIG. 1, and the process 140 terminates with an END step 490.

Figure 5:
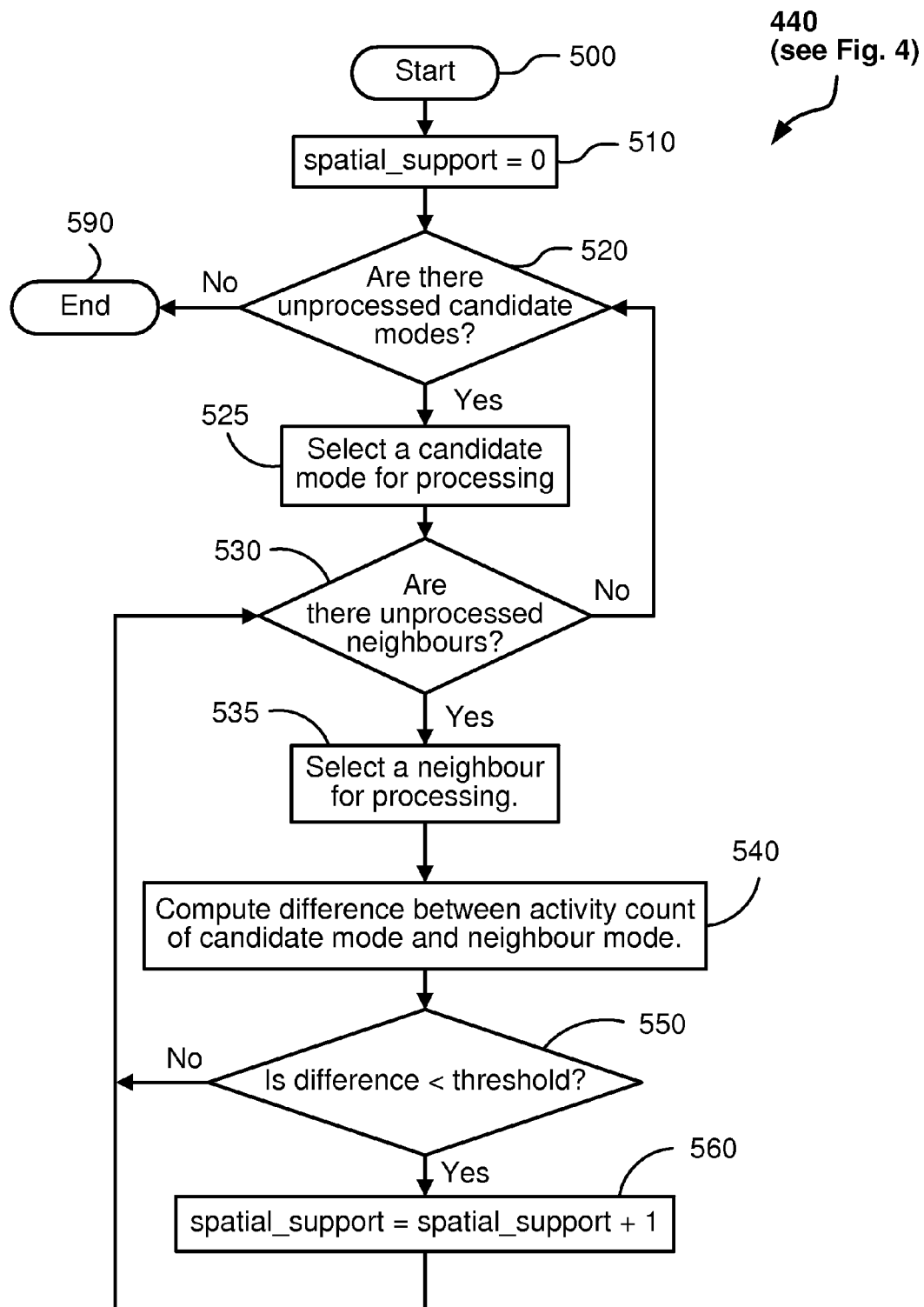
FIG. 5 is a flow diagram illustrating a method of computing spatial support.

FIG. 5 is a flow diagram illustrating a method 440 (see FIG. 4) of computing spatial support. The 440 process commences with a start step 500 and in a following step 510 the processor 805 initialises the spatial_support value to 0 (it is noted that candidate mode models such as 350 are compared to their neighbours in a later step 540). In a following step 520 the processor 805 determines if there are any further unprocessed candidate mode models. If there are no more candidate mode models for which spatial support should be computed, the process 440 is finished and is directed from the step 520 via a NO arrow to a step 590 which returns the spatial_support value and terminates. Otherwise, the process 440 follows a YES arrow from the step 520 to a step 525 in which the processor 805 selects an unprocessed candidate mode model such as 350 (see FIG. 3) for a temporal comparison with mode models such as 385 associated with neighbouring visual elements such as 331.

In a following step 530, the processor 805 determines if there are any unprocessed neighbouring visual elements. If this is not the case, then the process 440 follows a NO arrow from the step 530 back to the step 520. If however there remain unprocessed neighbouring visual elements, then the process 440 follows a YES arrow from the step 530 to a step 535.

In one arrangement, the 4-connected neighbouring visual elements such as 330 of the visual element 320 are considered in the step 535 by the processor 805, and one of the neighbouring visual elements such as 331 is selected for processing. The activity count such as 360 of the selected candidate mode model 350 and the activity count such as 387 of the selected mode model 385 (associated with the neighbouring visual element 331) are compared by the processor 805 in a subsequent step 540.

In one arrangement, the absolute value of the difference between the two activity counts 360 and 387 is calculated. In a following step 550 the processor 805 compares the absolute value of the difference to a threshold, say 5 frames or 1 second. If the value is smaller than the threshold, this means that the neighbouring visual element 331 has a selected mode model 385 that is temporally similar to a candidate mode model 350 associated with the visual element 320 in question, and in this case the process 440 follows a YES arrow from the step 550 to a step 560 in which the processor 805 increments the spatial support for that candidate mode model 350. Otherwise, the process 440 follows a NO arrow from the step 550 to the step 530 and the spatial support is unchanged.

In one arrangement, the process 440 is repeated for all candidate mode models of the visual element in question, and for all neighbouring visual elements. For example, if there are 3 neighbours such as 331 with a selected mode model 385 that is temporally similar to the candidate mode model 350, and 1 neighbour such as 330 with a sufficiently different activity count, then the spatial support for the visual element 320 is 3.

As previously noted, the step 450 in FIG. 4 identifies (selects) a matching mode from the candidate modes. For each candidate mode model such as 350, the spatial support and the visual support are added to compute a mode matching score as follows:

$$\text{Spatial\_Support} = \sum_i w_s^i \cdot \text{Spatial\_Support}^i \quad [1]$$

$$\text{Mode\_matching\_score} = w_v \cdot \text{Visual\_Support} + w_s \cdot \text{Spatial\_Support} \quad [2]$$

where: Spatial_Support$^i$ is the spatial support provided by the i-th neighbouring mode model, $w_s^i$ is the weight for the spatial support provided by the i-th neighbouring mode model, determining the contribution of that neighbour to the final spatial support value. In one arrangement, the weights have equal values for all neighbours, say 0.25. In another arrangement, the weight is 0.2 for the 4 horizontal/vertical neighbours, and the weight is 0.05 for the 4 diagonal neighbours. In another arrangement, the weights are adjusted for visual elements on the edge of a frame that have less than 4 4-connected neighbours. For example, the weight for diagonal 8-connected neighbours may be set to 0 in most cases, but set to 0.2 when an edge visual element is encountered. In another arrangement, weights correspond to the distance to the neighbour. For example, a direct 4-connected neighbour gets a weight of 0.15, while the 4-connected neighbour of the direct neighbour gets a weight of 0.05. Weight $w_v$ is the weight for the visual support, say 0.7, determining the contribution of the visual support to the mode_matching_score. Weight $w_s$ is the weight for the spatial support, say 0.3, determining the contribution of the spatial support to the mode_matching_score. In one arrangement, the spatial support is either 0 or 1 as determined by thresholding according to a Spatial_Support_Threshold, say 5 frames or 1 second as follows:

$$\text{Spatial\_Support}^i = \begin{cases} 1, & \text{if} |\text{activity\_count}^c - \text{activity\_count}^i| > \\ & \text{Spatial\_Support\_Threshold} \\ 0, & \text{otherwise} \end{cases} \quad [3]$$

In another arrangement, the spatial support is proportional to the difference in temporal characteristics:

$$\text{Spatial\_Support}^i = \begin{cases} 1 - \left|\dfrac{\text{activity\_count}^c - \text{activity\_count}^i}{\text{diff\_thr}}\right|^2, & \text{if} \left|\begin{array}{c}\text{activity\_count}^c - \\ \text{activity\_count}^i\end{array}\right| < \text{diff\_thr} \\ 0, & \text{otherwise} \end{cases} \quad [4]$$

where: activity_count$^i$ is the activity count of the i-th neighbouring mode model, and activity_count$^c$ is the activity count of the candidate mode model. Threshold value diff_thr is the maximum allowed difference, say 10 frames or 2 seconds, at which the spatial support is set to 0. Weight $w_s^i$ is a weight indicating the relative importance of the spatial support from the i-th neighbouring mode model, say 0.25. Spatial_Support is the total spatial support given to the candidate mode. Weight $w_v$ indicates the importance of the visual support, say 0.5, and weight $w_s$ indicates the importance of the total spatial support, say 0.5. Note that the weight can be used to normalise the support values, e.g. $w_s$ may be set to 1, whilst $w_s^i$ is set to 0.125 for each of the four components.

In one arrangement, the mode matching score is computed for each candidate mode model such as 350, and the candidate mode model 350 with the highest mode matching score is selected as the matching mode corresponding to the input visual element 320. In another arrangement, a mode matching threshold value, say 4, is used. The mode matching score is computed for candidate mode models such as 350 until a mode matching score exceeds the threshold. That is, the match is with a candidate mode model 350 that is good enough rather than the best.

Returning to FIG. 4, the processing of a visual element terminates with the step 490, after which another visual element can be processed in a similar fashion.

Similar to visual support and spatial support, a further metric referred to as "temporal support" may be included in the SABMM approach. In one arrangement, it is assumed that mode models are persistently matched over a period of time, meaning that if a mode model was matched in previous frames, it is likely to be matched in the current frame as well. In general, the temporal support value associated with a mode model is the number of times that mode model was selected as the matching mode model (according to the step 140 in FIG.

1 or the step 450 in FIG. 4) in the recent past (as defined by a predefined search window), for example in the previous frame or in the last 2 seconds.

The search window for computing the temporal support should not be too long as it would make it hard for a change in matching mode model. A large search window makes it harder to detect new foreground mode models, while a small window, say 1 frame, has the effect of noise reduction. Although the temporal support is useful in refining the mode matching decision, it should not have too high a weight in the mode_matching_score as follows:

$$\text{Mode\_matching\_score} = w_v * \text{visual\_support} + w_s * \text{spatial\_support} + w_t * \text{temporal\_support} \quad [5]$$

where $w_t$ is a weight indicating the importance ascribed to temporal_support.

The contribution of the various types of "support" (ie visual support, spatial support and temporal support) to the mode_matching_score is determined by the respective weights ($w_v$, $w_s$, and $w_t$) and the range of values of the various support attributes. The range of values of the various support attributes may be normalised directly, or they may be normalised via the respective weights.

In one example, the visual support has a range from 0 to 5 (as a system setting or as a user parameter setting), the spatial support has a range from 0 to 4 (4-connected neighbours), and the temporal support has a range from 0 to 1 (1 frame window). Furthermore, $w_v=0.33$, $w_s=0.33$, and $w_t=0.33$. This example does not lead to equal contributions, as the ranges are not normalised. The actual contributions are 0.5 for visual_support, 0.4 for spatial_support and 0.1 for temporal_support. In practice, it is desirable to set weights such that visual_support has an actual contribution of 0.5 or slightly higher, so that the spatial_support and temporal_support serve as corrections rather than dominant factors.

The weights for spatial_support may be adjusted based on the position of the visual element such as 320 in the input frame 300 (see FIG. 3). In one SABMM arrangement, if the visual element 320 is at the border of the input frame 300 and it has less than four 4-connected neighbours such as 330, then the weight for spatial_support is adjusted. For example, for a corner visual element such as 320, the spatial_support weight may be doubled. In another arrangement, additional neighbours such as 330 are recruited for border visual elements such as 320. For example, for a corner visual element such as 320 an additional 8-connected neighbour may be used, as well as an additional neighbour that is not immediately adjacent, for example the left adjacent neighbour of the left adjacent neighbour 330.

Iterations

In the above description, candidate mode models of a centre visual element (such as 320 in FIG. 3) are compared to selected mode models of neighbouring visual elements (such as "A", "B", "C" and "D"). The selection of the mode models of neighbours is based on the best match. This introduces an interdependency, as the best match of a neighbour may depend on the best match of the centre visual element. If only one iteration of the mode matching process is performed over the current frame 300, spatial support cannot be used in regard to all neighbours, and other measures need to be used for selection, such as the matching probability (this being related to visual support). However, if the process is iteratively performed a succession of times, ie if multiple iterations are successively performed, results can be refined at each iteration. The best matching mode model of the neighbour is then determined by the previous iteration.

In one arrangement, in a first seeding iteration mode models are selected based on the matching probability 370 (see FIG. 3). Then, in a second iteration, selections may be adjusted based on the spatial support. As in each iteration a mode model selection may be changed, there is a possibility that other mode model selections in the vicinity of the visual element in question (such as 320) are affected in the next iteration. In one arrangement, a fixed number of iterations, say 4, is performed. In another arrangement, iterations are performed until there are no more changes, or the number of changes is lower than a threshold, say 5%.

For each iteration, different parameter settings may be used. For example, a different connectivity may be used, say 8-connected instead of 4-connected, in each step. Also, the difference in temporal characteristics may be calculated differently, for example by applying a square root to the difference value.

Other SABMM Applications

When all visual the elements such as 330 in the input frame 300 have been matched to corresponding mode models, the matching candidate mode models can be classified (also referred to as segmented) as foreground or background. The classic, binary approach to segmentation would typically lead to a loss of information. For example, if a car is parked and a person walks in front of it, the segmentation result will show a combined car-person shape. There is no way of distinguishing the car and the person without going back to the original image. In the SABMM approach disclosed above, temporal characteristics are used to relate multiple visual elements to an object. The same temporal characteristics can be used to do a non-binary foreground/background segmentation, where the focus is on segmenting foreground objects in more detail. This approach is referred to as spatio-activity connected component analysis (SACCA).

Figure 6:
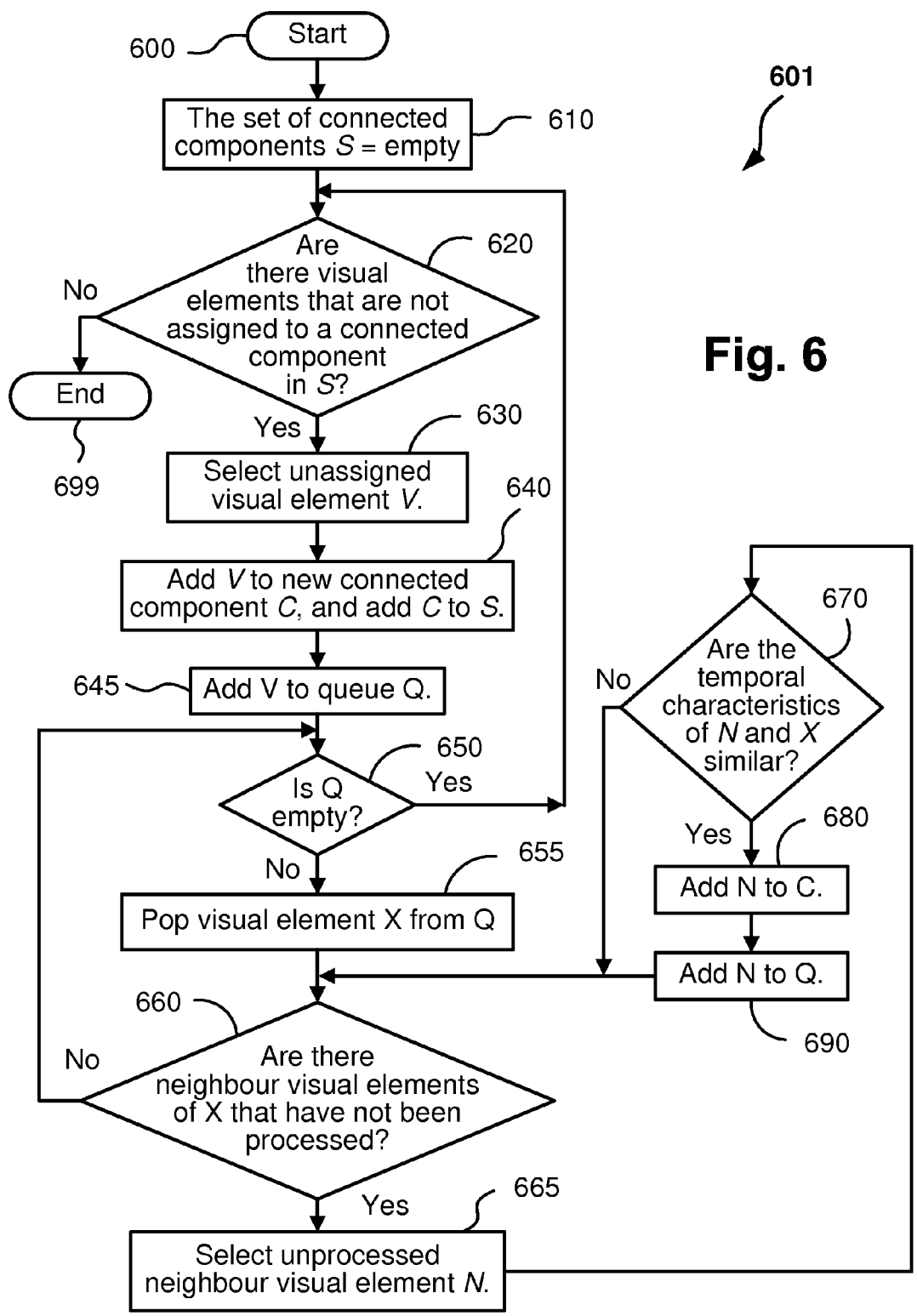
FIG. 6 is a flow diagram illustrating a method of activity based connected component analysis.

FIG. 6 is a flow diagram illustrating a method 601 of spatio-activity based connected component analysis. The purpose of the method 601 is to assign visual elements such as 330 to a connected component based upon the fact that the candidate mode 350 matches the visual element 320. The method 601 commences with a start step 600 and in a following step 610 the processor 805 initialises a set of detected connected components to an empty set. We refer to the set as S. In a following step 620 the processor 805 determines if there are visual elements such as 330 in the input frame 300 that have not yet been assigned to a connected component in S. If this is not the case then the input frame 300 has been processed and the method is complete, and the method 601 follows a NO arrow from the step 620 to a termination step 699.

If there are unassigned visual elements such as 330, then the method 601 follows a YES arrow from the step 620 to a step 630 in which the processor 805 selects an unassigned visual element V such as 330, where V has a unique identifier within the frame 300. In one arrangement, the selection is based on the coordinates of the visual element with respect to the input frame 300. For example, pixels or blocks are processed in a row-wise order, starting at the top-left corner of the frame 300. The unique identifier is, in the present example, made up of the x- and y-coordinates of the visual element. In a following step 640 the processor 805 creates a new connected component C, and visual element V is assigned to C, and C is added to S. In a following step 645 the processor 805 adds the visual element V to a processing queue.

In a following step 650 the processor 805 determines if the processing queue Q is empty. If this is the case the connected component C has been fully defined and control is returned via a YES arrow from the step 650 to the step 620 to find more connected components for unassigned visual elements such as 330. If the processing queue according to the step 650 Q is not empty, there may be more visual elements such as 330 that belong to connected component C. The process 601 thus follows a NO arrow from the step 650 to a step 655 which, to check this possibility, pops a visual element X from the processing queue Q, noting that X itself is already part of connected component C (see the step 645).

In a following step 660 the processor 805 checks whether the neighbouring visual elements (neighbours) of the visual element X have been processed already. A neighbour is considered processed if it has been assigned to a connected component in S. This connected component may be C, or it may be another, previously processed connected component. In one arrangement, the 4-connected neighbours are checked. In another arrangement, the 8-connected neighbours are checked. If, according to the step 660, there are no neighbours that have not yet been processed (that is all neighbours have been processed), then an edge of the connected component has been reached, and control follows a NO arrow from the step 660 to the step 650 to process queue Q further. If, according to the step 660 there are neighbours that have not yet been processed, then in a following step 665 the processor 805 selects an unprocessed neighbour N for further processing. In one arrangement, a random unprocessed neighbour is selected.

In another arrangement, the neighbouring visual element with the lowest unique identifier is selected. In a following step 670 the processor 805 compares the matched candidate mode models 350 of X and N according to similarity of one or more temporal characteristics. Accordingly, in one arrangement, the creation time of the mode model is used for comparison. If the difference between the creation time of N's matching mode model and the creation time of X's matching mode model is smaller than a threshold, say 10 frames or 3 seconds, the visual elements N and X are considered to be similar to one another. In another arrangement, the activity counts (such as 360) of the matching mode models are used for comparison. The mean and standard deviation of the difference in activity counts (such as 360) between matching mode models (such as 350) of a visual element (such as 320) and at least one neighbour (such as 330) in the input frame 300 are computed. Next, a threshold is set dynamically, for example to the mean minus 2 standard deviations. If the difference between the activity counts such as 360 of the matching mode models 350 of X and N is smaller than the threshold, the visual elements 320 are considered to be similar to one another.

If, according to the conditions considered in the step 670 the temporal characteristics of X and N are not similar, then the two visual elements such as 320 and 330 are not considered to be part of the same connected component C, and control is returned via a NO arrow from the step 670 to the step 660. If, according to the step 670 the temporal characteristics of X and N are similar, then the two visual elements are considered to be part of the same connected component C, and the process 601 follows a YES arrow from the step 670 to a step 680 in which the processor 805 adds N to C. In a following step 690 the processor 805 adds N to processing queue Q, so that the neighbours of N will be checked to be part of C in a later stage. Control is then returned to the step 660 to process visual elements in the queue Q further.

In one arrangement, the foreground/background segmentation is performed on the resulting set of connected components S. For each connected component C in S, the creation times of the corresponding matching mode models are used to determine whether the component is foreground or background. For example, the earliest creation time of all matching mode models corresponding to visual elements in C is used, or the mean creation time. The difference between creation time of C and the current time is then compared to a threshold. If the difference is greater than a threshold, the visual elements in C are considered background. If the difference is smaller than or equal to a threshold, the visual elements in C are considered foreground.

In another arrangement, foreground/background segmentation is integrated into the spatio-activity connected component analysis. For this approach, it is assumed that segmentation of background is not important, and that the focus is on further segmentation and separation of foreground. In the step 670, X and N are always considered to be similar if the temporal characteristics such as 360 of the matching mode models 350 of individual visual elements 320 both exceed a threshold. That is if they can both be considered background. If the threshold is not exceeded in both cases, the comparisons described above are applied. For example, X and N are considered similar if the differences between corresponding creation times and the current time are both higher than a threshold, say 200 frames or 60 seconds, even though X's creation time may be 100 seconds since system start and N's creation time may be 1000 seconds since system start.

Computing Probabilities

As previously noted in regard to determination of visual support values (eg see 420 in FIG. 4) multi-dimensional input image values from the visual element 220 can be mapped to one probability value, indicating the probability that a particular mode model such as 240 matches the input visual element 220 in question. Comparison of probabilities is then used to determine visual support values.

Returning to this issue in more detail, it is noted that in one arrangement, multi-dimensional values in mode models 350 are compared to a visual element 320 as follows. Let the modelled values in the mode model 350 be a subset of the available DCT coefficients, such as the first 6 out of 64 DCT coefficients of the Y-channel, the first out of 64 DCT coefficients of the U-channel, and the first out of 64 DCT coefficients of the V-channel. The coefficient values may be quantised or dequantised. For example, the mode model 350 values are {23,68,11,99,78,22,88,23}, and the visual element 320 has the corresponding values {48,60,9,88,76,55,87,13}. Now values can be computed that represent the correspondence between the mode model 350 and the visual element 320. In one arrangement, the absolute value of the differences are computed, in the example resulting in a multi-dimensional value {25,8,2,77,2,33,1,10}.

In another arrangement, an alternative colour space is used. Let the incoming values be coefficients according to the Y, U and V colour space (or the similar YCbCr colour space used in digital imaging systems). Then the original luminance component Y is used, but the U and V (or similarly Cb and Cr) chroma components are transformed to I and Q components of the YIQ colour space. The advantage of the YIQ colour space is that it is more robust to changes in colour due to lighting, e.g. in the case of shadows. That is, due to shadow invariance, the same colour with and without shadow cast on it will have more similar values in the YIQ colour space than in the original YUV or YCbCr colour space. The I and Q values can be derived from the U and V components by rotating the colour space coordinates 33 degrees. The I and Q differences (Idiff and Qdiff) between mode model 350 values and the visual element 320 can be computed as follows:

$$I\text{diff} = -\sin 33 \cdot (U_i - U_m) + \cos 33 \cdot (V_i - V_m) \quad [5A]$$

$$Q\text{diff} = \cos 33 \cdot (U_i - U_m) + \sin 33 \cdot (V_i - V_m) \quad [5B]$$

For computational efficiency, the sine and cosine values may be precomputed, and they may be rounded to integers, say 3 and 4 after multiplication with 5.

In another arrangement, additional interpretations of the values are computed, such as the chromatic distortion:

$$cd = (U_i - U_m)^2 + (V_i - V_m)^2 \qquad [6]$$

where $U_m$ is the first DCT coefficient value of the U-channel of the mode model, $U_i$ is the corresponding coefficient value from the input frame, and similarly $V_m$ and $V_i$ are the first DCT coefficient values from the mode model and input frame respectively. In the example, cd is 9701. The additional interpretations assist in distinguishing differences caused by shadows and differences caused by foreground objects.

An interpretation, such as the Y differences, I and Q differences, or chromatic distortion, is referred to as a feature f. The total set of features used is F.

The multi-dimensional value is provided to a classifier which maps multi-dimensional values to a scalar value. Although the scalar value can be a binary value, classifiers that provide a more refined confidence, likelihood, or probability are preferred. The scalar value is referred to as a probability. In one arrangement, there are multiple classifiers providing different sets of matches. For example, a first classifier determines whether there is a match, while a second classifier determines whether shadows are present.

The state of the classifier is determined prior to the classification in a training stage. In the training stage examples of similar and dissimilar mode model/visual element pairs are provided to train the classifier. Although it does not matter whether quantised or dequantised coefficients are used in the training and classification processes, it is important that they are consistent. In practice, a classifier trained for quantised coefficients can easily be converted into a classifier that works on dequantised coefficients, and vice versa, as long as the quantisation tables are known and the type of data (i.e. quantised or dequantised) is known.

In one arrangement, the classifier is a Support Vector Machine (SVM). For example, a linear Support Vector Machine trains weights, say $\{10,3,-2,5,1,1,7,-3\}$, and an offset, say $\{38\}$, and then uses the input values ($\{25,8,2,77, 2,33,1,10\}$ in the example) to compute a weighted sum which is used as a probability. In another arrangement, the classifier is a Näive Bayes classifier which computes the per-value probability $prob_f$ that a found value indicates similarity or dissimilarity based on distributions found in the training set. The per-value probabilities for all features in F, are multiplied to result in a final result probability $prob_{total}$:

$$prob_{total} = \prod_{f \in F} prob_f \qquad [7]$$

In one arrangement, there is a lookup table and the difference value or interpretation value is looked up and mapped to a per-value probability. In another arrangement, the probabilities are represented by a model that is an approximation of the actual probabilities. The model may be created through linear regression, such as the least squares method, the weighted least squares method or maximum likelihood estimation, or non-linear regression, such as the Gauss-Newton method or the Levenberg-Marquardt method. A non-linear regression problem may be turned into a linear regression problem by applying a transformation, such as a logarithm operation, at the cost of accuracy. In the case of a linear regression approximation, the mapping of a difference value or interpretation value to a per-value probability is then a matter of finding the corresponding point on a line. When the probabilities have been determined, they are multiplied. In another arrangement, the feature values are sampled into bins, where an example of a bin is value range 100 to 200, and the probabilities are determined for those bins.

As the probability values may be very small, in one arrangement logarithms are used. Instead of multiplying the per-value probabilities, the logarithms of the value are added as follows:

$$prob_{total}^{log} = \sum_{f \in F} \ln\left(\frac{1}{prob_f} - 1\right) \qquad [8]$$

Updating a Mode Model (Such as 350 in FIG. 3)

After a mode model such as 350 has been matched to the input visual element 320, the mode model 350 is usually updated based on the new measurement, i.e. visual element 320. This allows a mode model to adapt to changes in the visual content of the mode model, e.g. a lighting change. This adaptation addresses gradual changes, whereas abrupt, significant changes should lead to the creation of a new mode model.

In one arrangement, the mode model computes a moving average. Every value in the mode model 350 is updated with the corresponding value in the visual element 320. For example, the matched mode model 350 values are $\{23,68,11, 99,78,22,88,23\}$, and the visual element 320 has the corresponding values $\{48,60,9,88,76,55,87,13\}$. A learning rate, say 0.05, is used to determine how fast the mode model 350 updates. In the example, the new values are $\{0.95*23+0.05*48, 0.95*68+0.05*60,$ etc.$\}$. The learning rate may be different for each coefficient.

In another arrangement, the mode model 350 computes a median for each coefficient. For each coefficient, a history of values is kept, say the last 10 captures. The value of the input visual element 330 is added to the history and the values are sorted so that the median value can be selected. Although the median is a good measure for mode modelling because it is robust to noise, it is also computationally very expensive.

In yet another arrangement, the mode model 350 adapts through an approximated median approach. No history is kept. Instead, the values of the input visual element 330 are compared to the values of the mode model 350 for each modelled coefficient coeff resulting in model updates as follows:

$$Model_{coeff}^t = \begin{cases} Model_{coeff}^{t-1} + c_{up}, & \text{if } Captured_{coeff} > Model_{coeff}^{t-1} \\ Model_{coeff}^{t-1}, & \text{if } Captured_{coeff} = Model_{coeff}^{t-1} \\ Model_{coeff}^{t-1} - c_{down}, & \text{if } Captured_{coeff} < Model_{coeff}^{t-1} \end{cases} \qquad [9]$$

where $Model^t_{coeff}$ models the coeff-th coefficient at time t (or the t-th frame processed), $Captured_{coeff}$ is the coeff-th coefficient value of the captured incoming block.

Hence, the values in the mode model are adjusted based on the direction of the difference rather than on the actual value. The mode model 350 values are increased with constant $c_{up}$, say 1, or decreased with $c_{down}$, say 1. The constant value may be different for each coefficient, and its magnitude determines how fast the mode model 350 adapts to captured values. The values of the constants may change over time. For example, initially the constants are set to a relatively high value, say 5, so that the mode model 350 can converge quickly. After modelling the scene for a while, the constants can be set to a lower value so that the mode model 350 is more robust to noise. The constants may be set to higher values again when a big change has been noticed in the scene or a part of the scene, e.g. if the lights are switched on or off.

In yet another arrangement, the mode model is not updated at all if some combination of criteria are met. For example, if the incoming data is deemed to have a high proportion of noise, or conversely if a mode match was so close that the mode would not be affected.

Deleting a Mode Model

Mode models 350 are kept in the memory 806 even when they have not been matched to the current visual element 320. This allows mode models 350 to match later input. However, in one arrangement, mode models 350 are not kept indefinitely. Firstly, memory resources may be limited. If a mode model 350 is not likely to be matched to later input, it should be deleted so that new mode models 350 can be created. Secondly, different objects may appear in the scene at different times but with the same visual characteristics. For example, when a person with a red coat stands at a location for a while, the mode model 350 will model the visual characteristics of the red coat. When another person with a red coat appears at the same location, a match is found even though it is a different person. Although this problem is unavoidable when just processing and modelling visual elements, it can be mitigated by deleting mode models 350 when they appear not to be in use. That is, if the second person with a red coat appears 1 second later, there may be a mode model match, but if the second person appears 1 day later, there won't be a model match.

In one arrangement, the temporal characteristics of all mode models 350 are checked as deletion candidates after the mode matching processing has finished. If the difference between the current time and the reappearance time (last time the mode model was found not to be representative for the input visual element) is more than a threshold value, say 1000 frames or 300 seconds, the mode model is removed or its temporal characteristics are reset.

Creating New Modes and Dealing with Shadows

Over time, new mode models may be created, e.g. when a new object enters the scene or when the background of the scene changes, such as a light being turned on. It is not desirable that input visual elements are always matched to an existing mode model. They should only be matched if the match is sufficient.

In one arrangement, a probability is computed that represents the probability that a mode model matches an input visual element with an acceptable level of confidence. In other words, a probability is determined that provides a figure of merit (ie a confidence level) for the mode matching performed, for example, by the step 140 in FIG. 1, or the step 450 in FIG. 4. This probability is computed for each candidate mode model. If the best matching probability is below a predetermined threshold, say 0.5, it is concluded that there is no suitable existing mode model for matching, and a new mode model needs to be created. The new mode model is initialised with the values of the captured input frame.

In another arrangement, the problem of shadows is addressed. It is debatable whether a shadow is foreground or background, and the decision depends on the context of a foreground separation application. In the context of this document, shadows are treated as non-foreground, as otherwise shadows tend to merge separate objects into one big object. That is, shadows need to be ignored.

Figure 7:
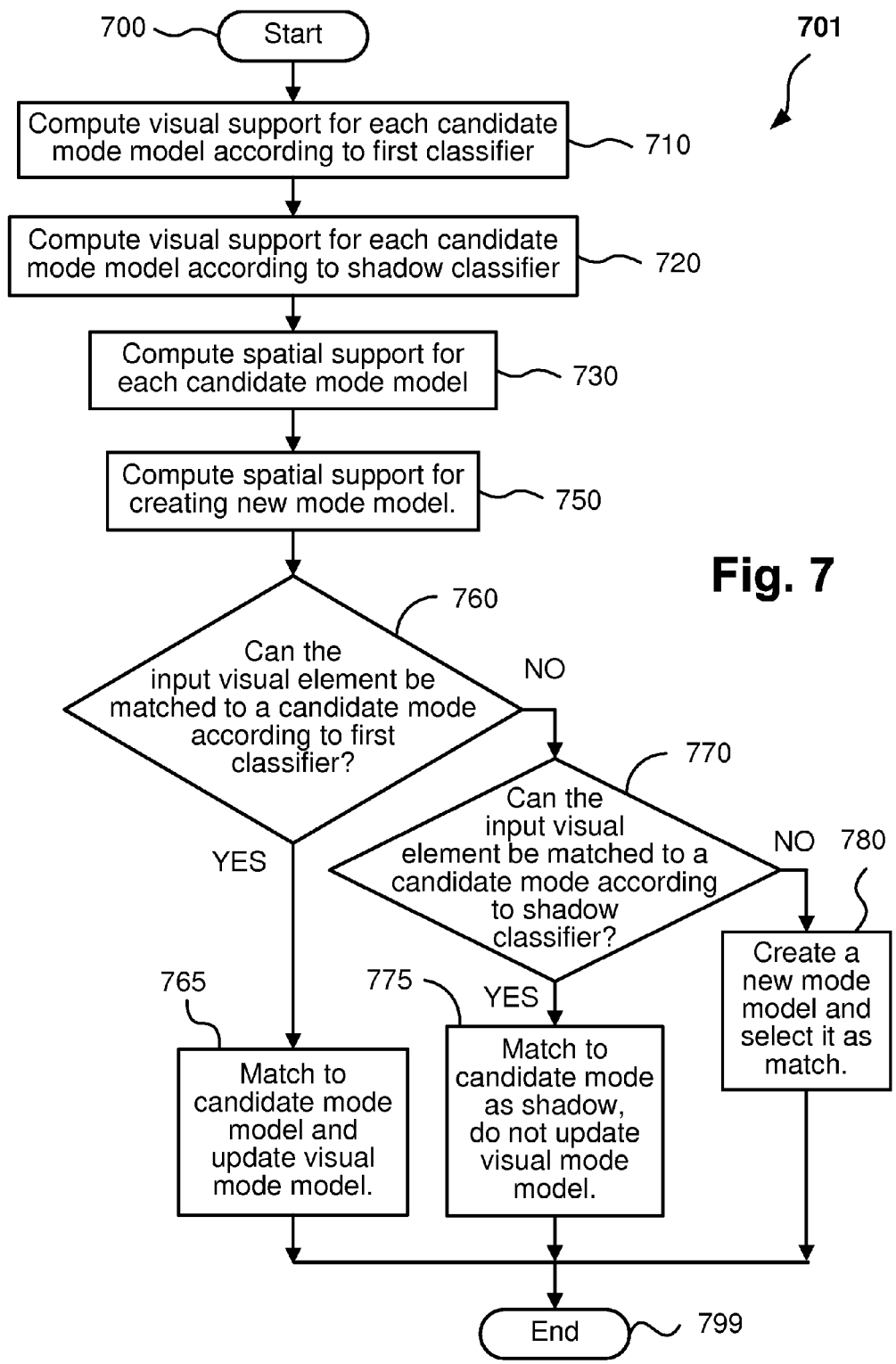
FIG. 7 is a flow diagram illustrating a method of shadow invariant updating of the visual element model.

FIG. 7 is a flow diagram illustrating a method 701 of shadow invariant updating of the visual element model. The process 701 commences with a start step 700 and in a following step 710 the processor 805 determines, using a classifier approach, a probability for each of the candidate mode models, as described earlier. This first probability is the probability that a mode model matches an input visual element, and the step 710 determines the regular visual support value. In a following step 720 the processor 805 determines a second probability which is the shadow probability that an input visual element is shadow (on top of the visual characteristics of a mode model) and the step 720 also determines a "shadow visual support" value.

In a following step 730 the processor 805 determines spatial support for each candidate mode model after which in a step 750 the processor 805 determines spatial support for creating a new mode (that is a mode with temporal characteristics initialised to start values, such as activity count of 0 and creation time of the current time). This enables a visual element to be classified into one of three classes namely "normal mode match", "shadow mode match", and "no mode match".

In a following step 760 the processor 805 determines a mode_matching_score (based on the visual support from the step 710 and the spatial support from the step 730) of the best matching candidate mode and compares this mode_matching_score to a threshold value, say 0.6, in order to find out if a match with an existing mode can be made. If, according to the step 760, the candidate mode does exceed the threshold, a normal match is found and the process 701 follows a YES arrow from the step 760 to a step 765 which updates the mode model according to the contents of the visual element. The process 701 is then directed to a STOP step 799.

Otherwise, if according to the step 760 the candidate mode model does not exceed the threshold, the creation of a new mode model is considered. To this end, the process follows a NO arrow from the step 760 to a step 770 in which the processor 805 determines the best matching candidate mode according to the shadow probability. Accordingly the step 770 compares the shadow probability to a threshold, say 0.7. If the shadow probability is higher than the threshold, no new mode is created, and the process 701 follows a YES arrow from the step 770 to a step 775 in which the processor 805 makes a match with that candidate mode. However, the candidate mode is not updated with the contents of the visual element. The process 701 is then directed to the STOP step 799.

Returning to the step 770, if the shadow probability is not higher than the threshold, then the process 701 follows a NO arrow from the step 770 to a step 780 in which the processor 805 creates a new mode model, which is initialised with the input visual element's contents. The process 701 is then directed to the STOP step 799.

Note that shadows may be classified as "normal mode match". This is acceptable, as the purpose of the shadow ignoring process is to not create new modes for shadows. There is no problem with classifying shadows as existing mode models.

In the above description, visual support was used to match modes. The range of values for visual support is usually quite small, because it is usually not necessary to be more than 1 value higher than the combination of spatial and temporal support, which in practice have maximum values limited by resource constraints. As a consequence, more than one mode may have the same support value and a best match cannot be determined. In one arrangement, the matching probability value is used as a tie breaker because it has a much wider range of values. Alternatively, the mode model that matched the visual element in the previous frame is selected, or an arbitrary mode model may be selected.

Processing Set

For ease of understanding, the above description describes processing of all visual elements in a frame. However, it may be possible to process only a subset of the visual elements. For example, only a user defined region of interest may be processed. In another example, if the resolution of the input frame 300 is sufficient, every fourth or second visual element is skipped.

Further SABMM Implementation Details

The SABMM methods may, as described in regard to FIG. 8, be implemented using the camera arrangement 800 wherein the processes of FIGS. 1, and 4-7 may be implemented as software, such as one or more application programs 810 executable within the camera system 800. In particular, the SABMM method steps are effected by instructions in the software that are carried out within the camera system 800. The instructions may be formed as one or more code modules, each for performing one or more particular tasks. The software may also be divided into two separate parts, in which a first part and the corresponding code modules performs the SABMM methods and a second part and the corresponding code modules manage a user interface between the first part and the user.

The software may be stored in a computer readable medium, including the memory 806. The software is loaded into the camera system 800 from the computer readable medium, and then executed by the camera system 800. A computer readable medium having such software or computer program recorded on it is a computer program product. The use of the computer program product in the camera system 800 preferably effects an advantageous apparatus for practicing the SABMM approach.

The camera system 800 also has an interface 808 which permits coupling of the camera module 801 to the network 814.

Typically, the SABMM application programs discussed above are resident in the memory 806 and read and controlled in execution by the processor 805. In some instances, the SABMM application programs may be supplied to the user encoded on one or more CD-ROM which can be loaded onto a PC (not shown) and downloaded onto the camera module 801 through a suitable interface (not shown), or alternatively may be read by the user from the network 814. Still further, the software can also be loaded into the computer system 800 from other computer readable media.

Computer readable media refers to any storage or transmission medium that participates in providing instructions and/or data to the computer system 800 for execution and/or processing. Examples of such media include floppy disks, magnetic tape, CD-ROM, a hard disk drive, a ROM or integrated circuit, a magneto-optical disk, or a computer readable card such as a PCMCIA card and the like, whether or not such devices are internal or external of the camera module 801.

Examples of computer readable transmission media that may also participate in the provision of instructions and/or data include radio or infra-red transmission channels as well as a network connection to another computer or networked device, and the Internet or Intranets including e-mail transmissions and information recorded on Websites and the like.

The second part of the application programs and the corresponding code modules mentioned above may be executed to implement one or more graphical user interfaces (GUIs) to be rendered or otherwise represented upon a camera display (not shown). Through manipulation of a keypad (not shown) a user of the camera system 800 and the application may manipulate the interface to provide controlling commands and/or input to the applications associated with the GUI(s).

The SABMM method may alternatively be implemented in dedicated hardware such as one or more integrated circuits performing the functions or sub functions of the SABMM approach. Such dedicated hardware may include graphic processors, digital signal processors, or one or more microprocessors and associated memories.

Stationary Object Detection

The SABMM approach can also be used in MMBM arrangements in order to classify foreground objects as stationary.

As a precursor to identifying stationary objects, it is instructive to explore the kinds of change that a part of a scene can undergo which result in the scene having a new, stationary part which differs from its previous appearance. This is referred to as a stationary change.

One type of stationary change to a video scene is the introduction of an abandoned object. A common example of an abandoned object in a video surveillance setting is a dropped bag or a suspicious package that is placed in the scene being observed. It is advantageous for the MBMM system to be able to draw an operator's attention to such objects, or to mark their occurrence for later examination.

Figure 9:
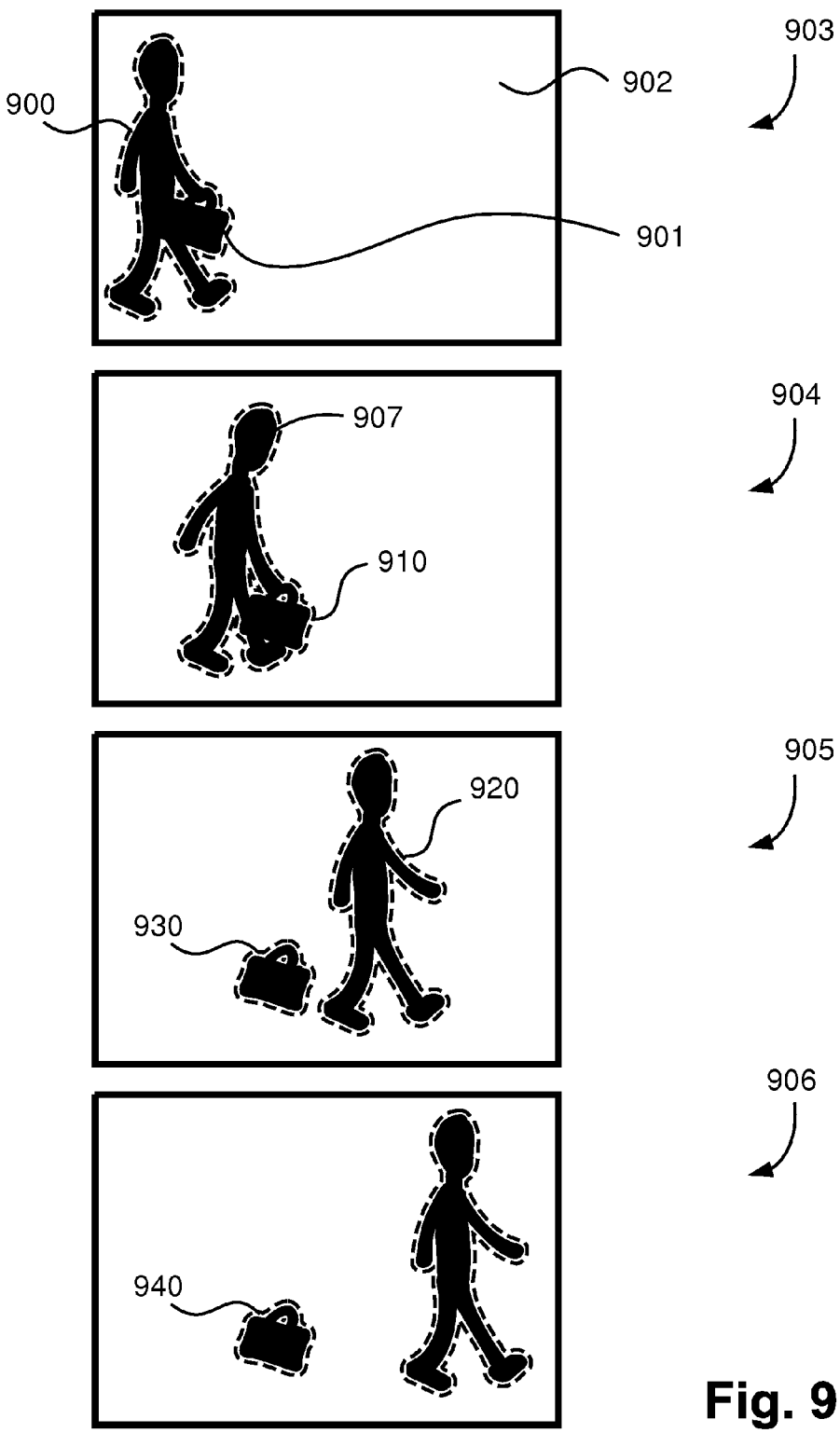
FIG. 9 depicts a video scene in which an object is abandoned.

FIG. 9 shows four sequential (but not necessarily consecutive) video frames 903-906 from an example scenario for abandoned object detection. In the first frame 903 a person 900 enters a scene 902 carrying a bag 901. In the later frame 904 the person 907 lowers the bag 910 towards the floor (not shown). In the later frame 905 the person 920 walks away from the bag 930 which has been placed on the floor (not shown). The appearance of the bag 930 when it first appears as a separate object in the frame 905 does not substantially change in its appearance 940 in the later frame 906.

Clearly the appearance of the bag 940 will change at some later time if someone comes along and picks up the bag 940, however for the purposes of the MMBM arrangement, if the appearance 940 does not change for a predetermined time (defined more precisely in terms of an "age threshold" and other parameters as described below), the object 940 is considered to have undergone a stationary change.

A second type of stationary change to a video scene is the removal of an object that was previously considered to be background. In a video surveillance setting, this could be an item of value that is being monitored, such as a painting on a wall. In this case, the change to the visual appearance of the scene is not the object itself, but the newly observed background behind the (removed) object. Again, it is advantageous for the MMBM system to be able to draw an operator's attention to such an event.

Figure 10:
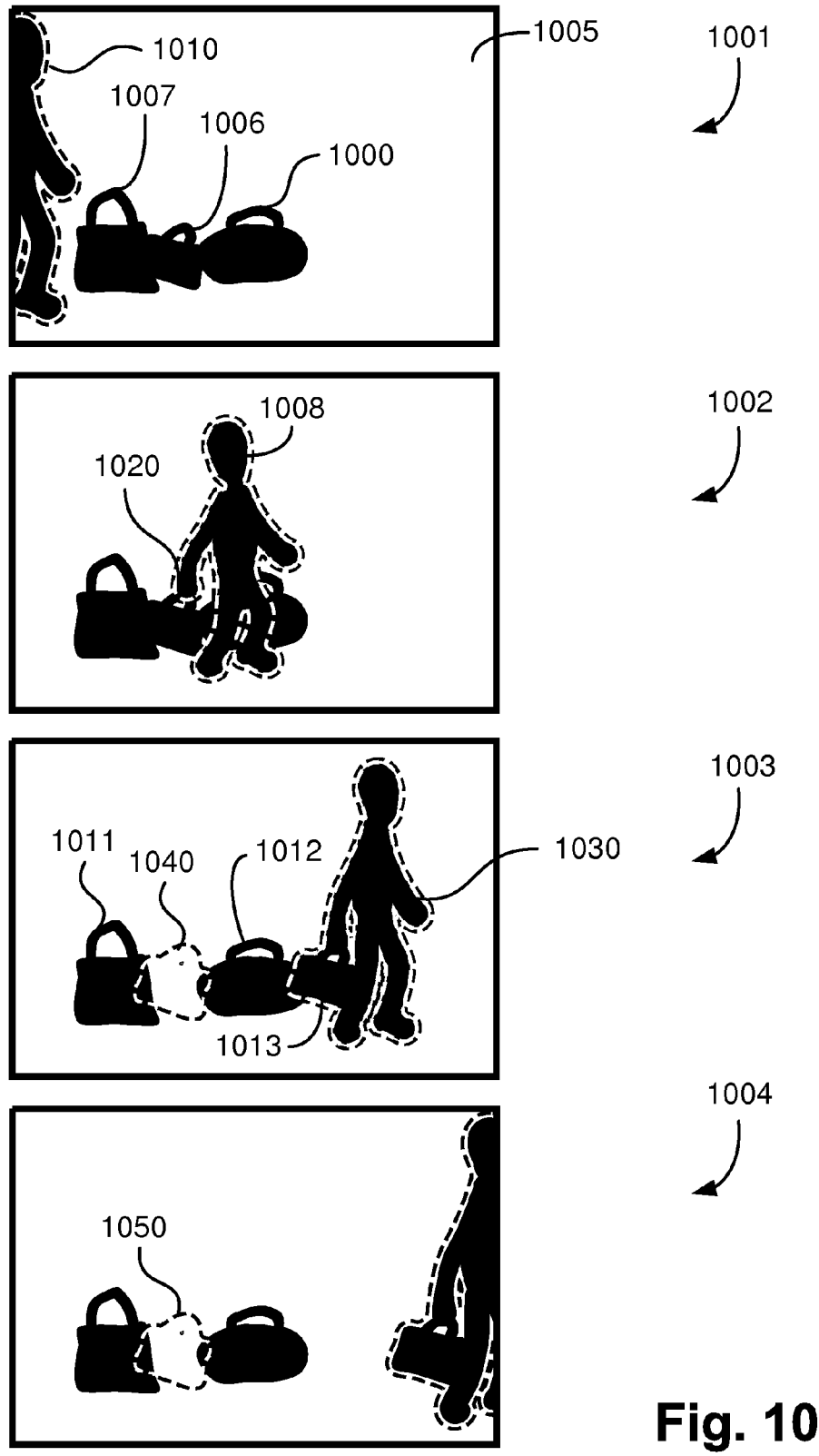
FIG. 10 depicts a video scene in which an object is removed.

FIG. 10 shows four sequential video frames 1001-1004 from an example scenario for abandoned object removal detection. In the first frame 1001 three bags 1000, 1006, 1007 have been part of a scene 1005 long enough to be considered to be background. A person 1010 is shown to have entered the scene 1005. In the later frame 1002 the person 1008 takes hold of one of the bags 1020, and in the later frame 1003 the person 1030 walks away from the bags 1011, 1012 holding the bag 1013. The appearance of the background differs in the region 1040 that the bag 1013 previously occupied, however the new appearance of the region 1050 does not vary in the later frame 1004.

Clearly the appearance of the region 1050 will change at some later time if someone comes along and places something into the region 1050, however for the purposes of the MMBM arrangement, if the appearance 1050 does not change for a predetermined time (defined more precisely in terms of an "age threshold" and other parameters as described below), the region 1050 is considered to have undergone a stationary change.

These two types of stationary changes (relating respectively to an abandoned object event and an object removal event) have similar properties. In both cases, the visual elements that make up the object (ie the bag 940 in FIG. 9, and the "empty" region 1050 in FIG. 10), are different in appearance from the background model, but otherwise do not change in appearance during the time in question in subsequent frames. For the purposes of the MMBM arrangements, these different changes in appearance will be treated as instances of the same event.

Thus, a "stationary foreground object" refers to an object that has undergone a stationary change, whether the stationary foreground object is a new object, or a portion of previously unseen background. In other words, the stationary foreground object is a connected region that appears different to the remembered background, but has not exhibited change of appearance for some time. In one MMBM arrangement, an object is considered to be stationary if the appearance of the object has not substantially changed during a time interval defined by a fixed threshold, say, 50 frames or 10 seconds.

A challenge in the detection of stationary foreground objects is to make their detection robust to occlusion. A common example of occlusion is someone walking in front of an abandoned object. The MMBM system is able to recognise that the object has only changed appearance briefly, and can still report the presence of the object as a stationary object after the occlusion has passed. A converse challenge, however, is to avoid reporting objects that are changing slowly over time. Examples of this include an object that slowly moves away from an initial position, an object that moves in infrequent bursts, or an object that maintains the same position in the frame and covers the same region of the frame over time, but changes in appearance inside the object boundaries.

The MMBM approach uses the temporal characteristics of the matched mode models associated with the visual elements of the object in question in order to determine whether the object is stationary. One such temporal characteristic is the mode "age" measure, defined as the difference (in number of frames) between the current time and the creation time of the mode model. The age measure of a new mode model starts at 1 and increases by 1 for each frame examined thereafter, regardless of whether the mode model is matched in the current frame or not. Thus, the age measure continues to increase until the mode model is deleted according to any of the methods described under the heading "Deleting a mode model".

In a preferred arrangement, the age itself is not stored for each mode model. Instead, each mode model stores the sequential number of the frame in which it was created. The age measure of any mode model can be calculated by subtracting the sequential number of the frame in which that mode model was created from the sequential number of the current frame, and adding 1. For example, if a mode model was created at frame number 500, and the currently examined frame is numbered 2000, then the age of the mode model is 2000−500+1=1501.

In an arrangement where a new mode model is created when the data from the video scene does not sufficiently match any existing mode model, the age of the mode model matched to a visual element of the currently examined frame corresponds to the number of frames that have passed since the frame in which the visual element in question first matched that mode model.

In one arrangement, the representative age of an object is defined as the median age of the matching mode models that correspond to each of the visual elements of the object. The median age is robust to minor variations in visual elements across the object. In another arrangement, the arithmetic mean age is used instead of the median age. The mean age requires less computation than the median, and is advantageous in embedded, real-time or high-load systems. In either of these arrangements, an object may be considered stationary if its representative age exceeds a given threshold value, for example, 50 frames or 10 seconds.

Figure 11:
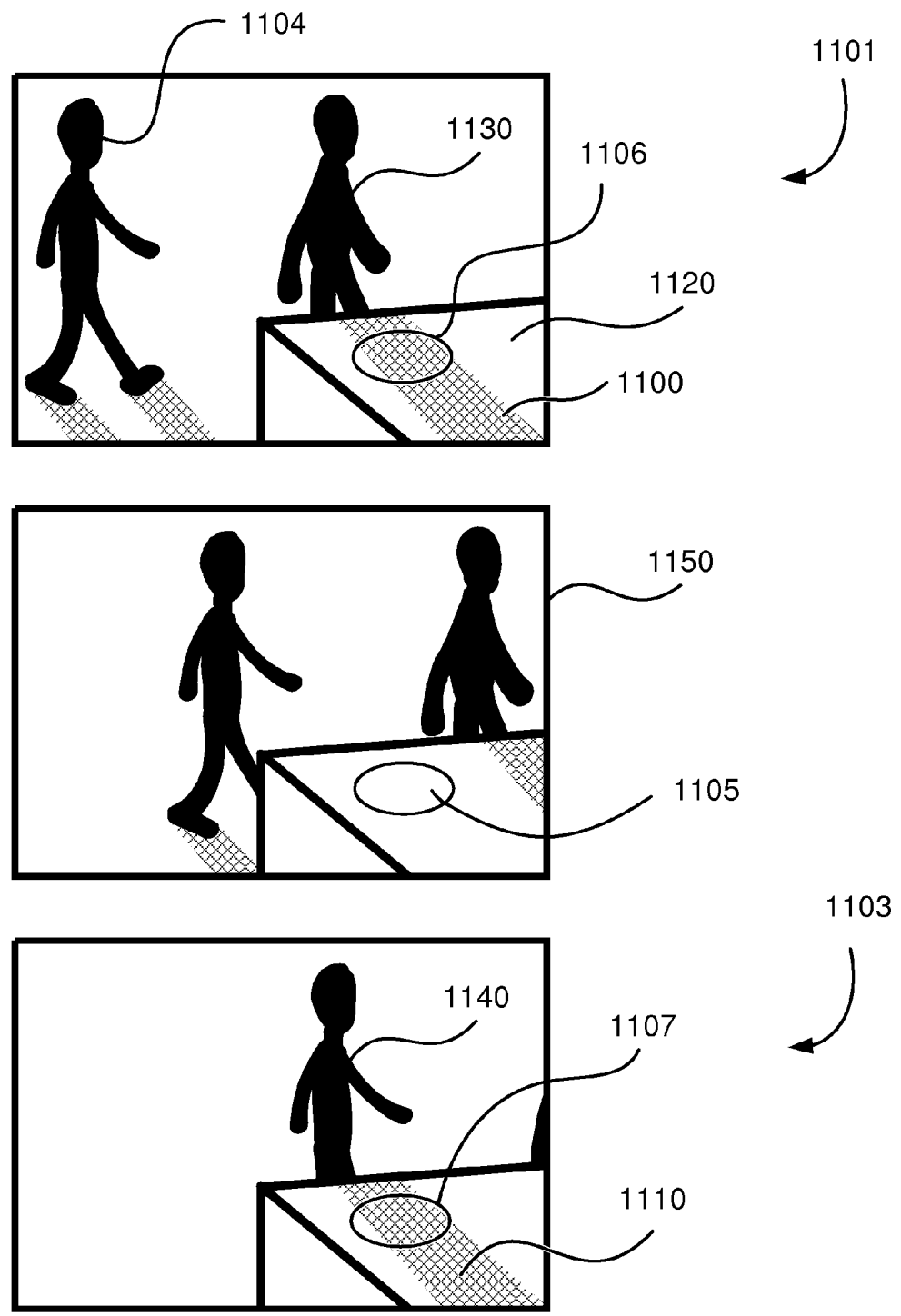
FIG. 11 depicts a video scene in which different objects cause the intermittent reappearance of a shadow.

One limitation of this arrangement is in monitoring a scene where a region repeatedly but intermittently changes to a particular appearance such as depicted in FIG. 11.

FIG. 11 shows three sequential (but not necessarily successive) video frames 1101, 1150 and 1103 in which shadows 1100, 1110 are cast on an object or surface 1120 by other objects 1130, 1140 in the scene. Although the objects (in this case, people 1130, 1104) may have a different appearance, their respective shadows 1100, 1110 can sometimes appear similar enough so that visual elements 1106, 1107 belonging to the object 1120 in question match the same mode models. Note that in the intermediate frame 1150 the visual element in question 1105 is not in shadow. In cases like this, the first time a visual element such as 1106 in the scene changes appearance in this way (eg between 1106 and 1105), a new mode model is created. The second time the same visual element changes appearance in the same way, the appearance of the visual element will match the mode model created earlier. If this happens a sufficient amount of time later to satisfy the stationary object age threshold, then the object 1120 is treated as a stationary object, despite not being visible for some or most of that time.

Thus, another arrangement additionally uses the activity count measure for the corresponding mode models. As with the age measure, a representative activity count for each object is calculated in terms of the median or mean of the activity counts of the matching mode models for each of the visual elements of the object in question. A preferred arrangement determines the ratio of the representative activity count to the representative age, providing an approximate measure of how often that region of the scene (typically a set of visual elements or an object) has had that appearance since it first attained that appearance. The object is considered stationary if both its representative age exceeds a predetermined threshold value, and the ratio of its activity count to its age exceeds another predetermined threshold, for example 0.85.

Although the described MMBM arrangements make use of the representative age, an associated first predetermined threshold value, the ratio of the representative activity count to the representative age and an associated second predetermined threshold value, other functional relationships can be established between the age and activity count, and evaluation of the functional relationships against associated thresholds, can be used to determine if an object is stationary according to the MMBM approach.

The above-noted thresholds determine how sensitive the MBMM arrangement is to stationary objects. The age threshold determines the minimum amount of time that an object must be motionless (ie must not change visually) in the scene before it is considered to be stationary by the MMBM system. The ratio threshold determines, in broad terms, how tolerant the system is to occlusion, lighting changes, shadows, and other minor variations in object appearance. Specifically, the ratio threshold determines the minimum proportion of the time that an object appears in the scene for which it is required to have substantially the same appearance before it is considered a stationary object.

Figure 12:
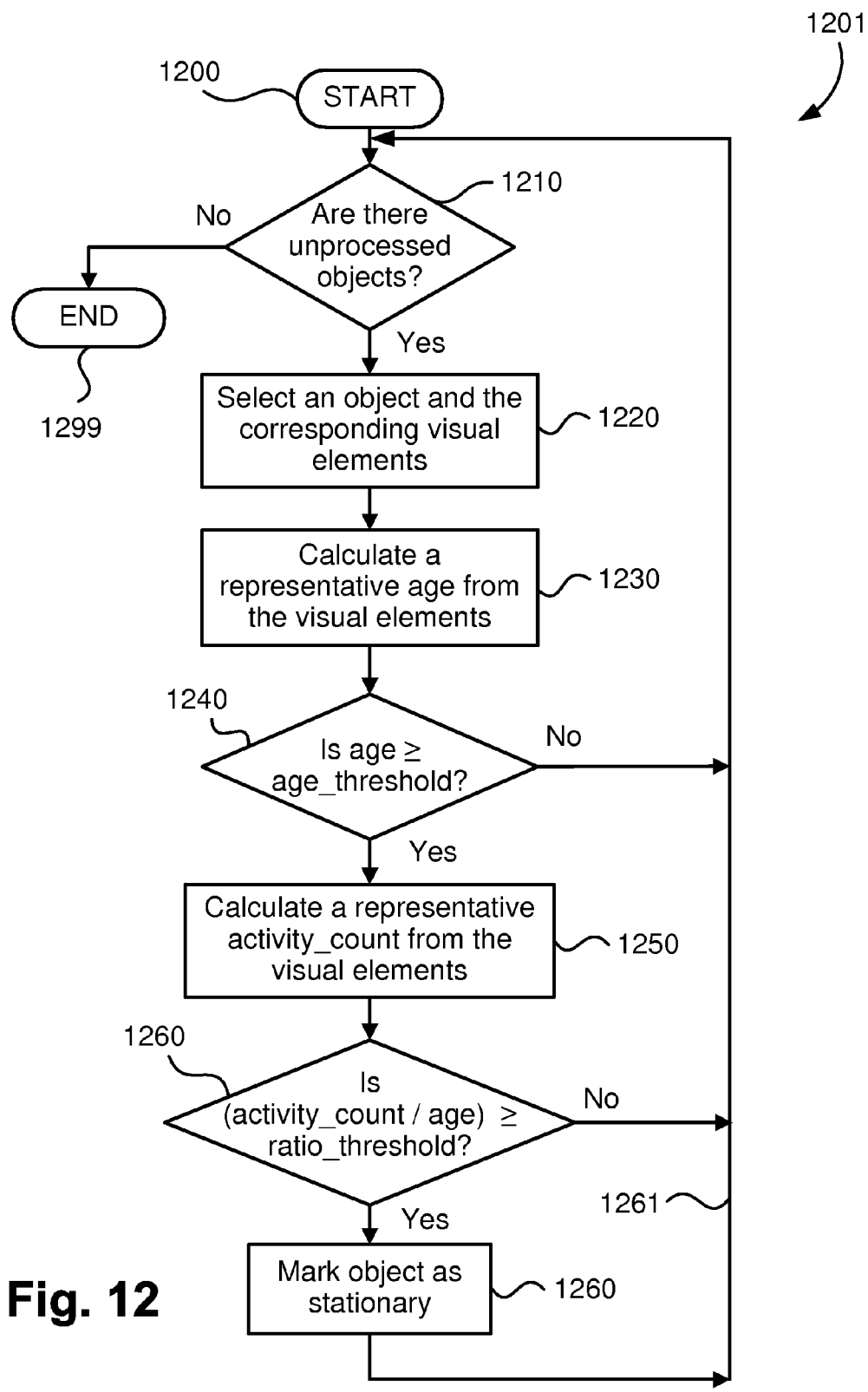
FIG. 12 is a flow diagram depicting an example of an MMBM method of determining if an object is stationary.

FIG. 12 is a flowchart describing an example 1201 of an MMBM method for detecting a stationary object. The process commences with a START step 1200 with objects detected and segmented for a video frame (using for example the process 101 in FIG. 1). In a following step the processor 805 (see FIG. 8) checks whether there are any objects that have not yet been examined to see whether they are stationary. If there are no remaining unprocessed objects, the process 1201 follows a NO arrow from the step 1210 to an END step 1299.

Returning to the step 1210, if there are more objects to be processed, the process 1201 follows a YES arrow from the step 1210 to a step 1220 in which the processor 805 selects one of the objects, along with the visual elements that comprise it. In a following step 1230 the processor 805 determines a representative age for the object from the object's visual elements, based on the median or mean of the ages of each of the matching mode models of the visual elements. In a following step 1240 the processor 805 compares the representative age to an age threshold value. If the representative age is not greater than the age threshold, the process 1201 follows a NO arrow from the step 1240 to the step 1210 which determines if there are any unprocessed objects.

Returning to the step 1240, if the representative age is greater than the age threshold, then the process 1201 follows a YES arrow from the step 1240 to a step 1250 in which the processor 805 determines a representative activity count from the visual elements. In a following step 1260 the processor 805 then determines the ratio of the representative activity count to the representative age, and compares this ratio to a ratio threshold value. If the ratio is not greater than the ratio threshold, the process 1201 follows a NO arrow from the step 1260 back to the step 1210 which selects another unprocessed object.

Returning to the step 1260, if the representative ratio is greater than the ratio threshold, then the process 1201 follows a YES arrow to a step 1260 in which the processor 805 marks the object as stationary, and the process 1201 follows an arrow 1261 back to the step 1210 to select another unprocessed object.

Figure 13A:
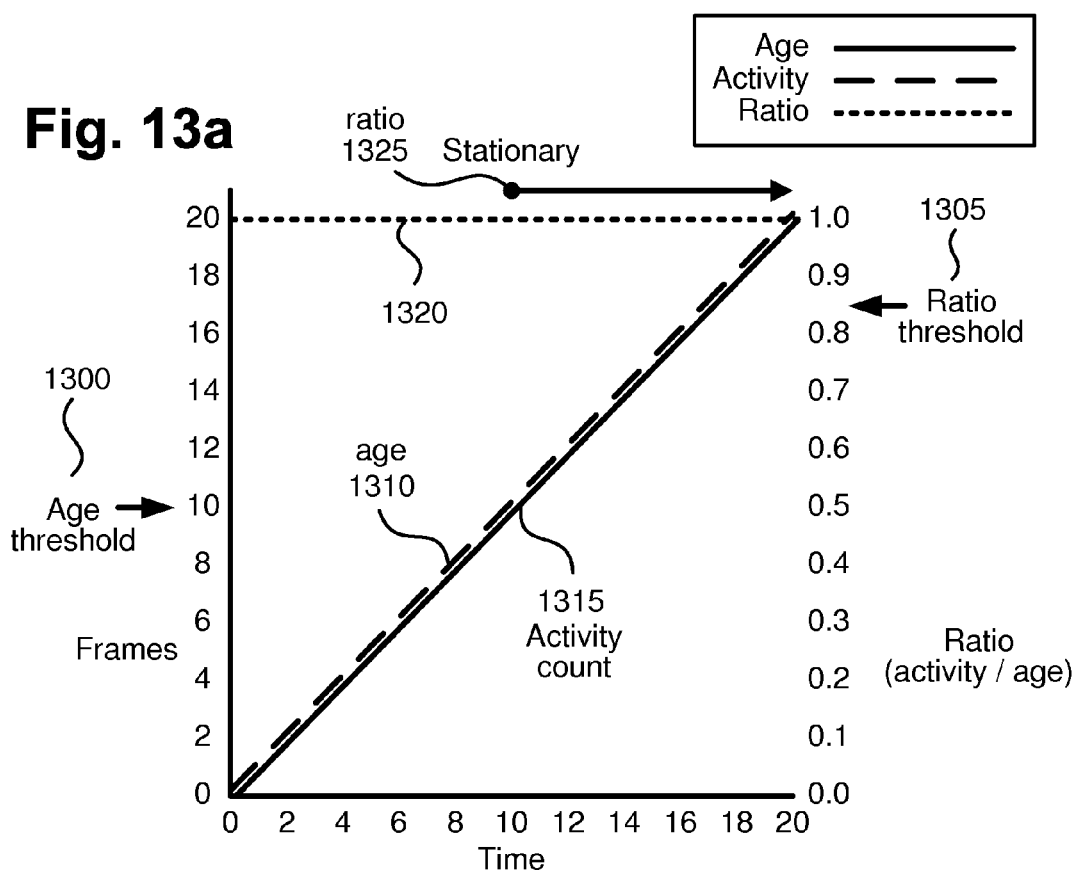
FIG. 13 shows graphs of age, activity count and the ratio of the two over time in four different MMBM scenarios.

FIG. 13a to 13d show, for each of four different MMBM scenarios, graphs representing the age, activity count, and the ratio between the two over time for a newly detected stationary object. In each of the scenarios, as illustrated in FIG. 13a, the threshold values for considering an object to be stationary are as follows:
  age threshold=10 frames (see reference numeral 1300);
  ratio of activity count:age=0.85 (see reference numeral 1305).

Figure 14:
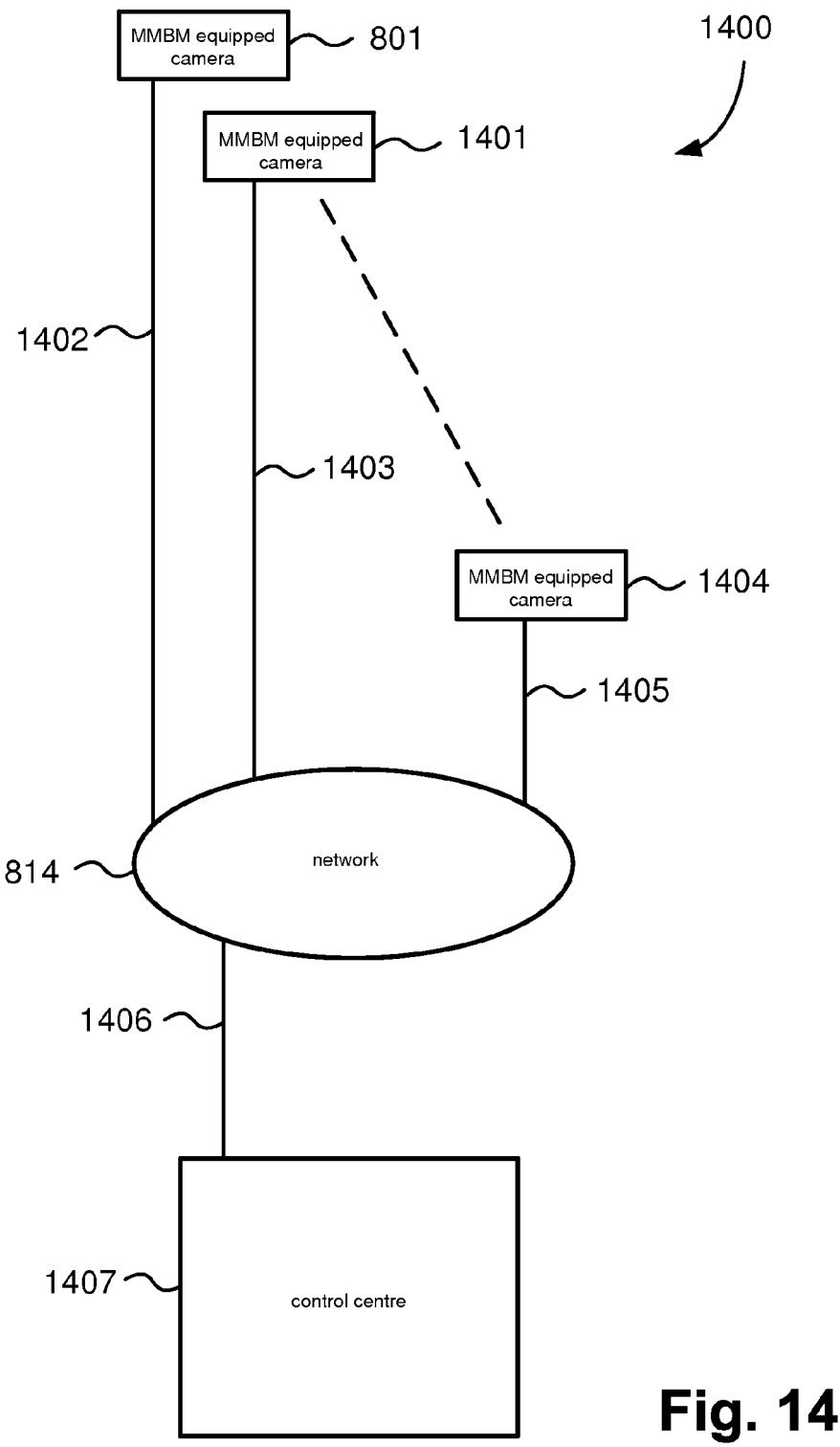
FIG. 14 shows an MMBM multi-camera system.

The above noted threshold values are merely examples, and other threshold values can be used for different applications as described in relation to FIG. 14.

FIG. 14 shows a multi-camera MMBM system 1400 comprising a number of MMBM equipped cameras 801, 1401 and 1404 connected to the network 814 by respective connections 1402-1405. A control centre 1407 is connected to the network 814 by a connection 1406. Each camera monitors a respective field of view, and the aggregate of the fields of view comprise the scene that is monitored by the system.

An administrator (not shown) in the control centre 1407 can set thresholds in each of the cameras 801, 1403, 1404 to suit the particular application for which the system 1400 is being used. For example, in a busy airport where occlusion is common and it is important to detect stationary objects quickly, the system administrator can set the age threshold to 50 frames (10 seconds at 5 frames per second), and the ratio threshold to 0.8. In a less busy setting such as a warehouse, where occlusion and other movement is less likely and objects can be stationary for long periods of time, the system administrator can set the age threshold to 300 frames (1 minute at 5 frames per second) and the ratio threshold to 0.99.

The images captured by the cameras 801, 1401-1404 are typically displayed on multiple and/or split displays (not shown) in the control centre 1407. Objects identified by the MMBM arrangements can be highlighted on the screens to effectively alert an operator who is monitoring the screens. The aforementioned identification can also be used to sound an audible alert to draw the attention of the operator to the display(s).

As the MMBM arrangements determine (as described in relation to FIGS. 13a-13d) that an object is progressing towards identification as a stationary object, the object can be highlighted in a progression of colours, for example progressing from a green outline, through yellow to red.

FIG. 13a shows a graph for an object that appears and maintains the same appearance for at least 20 frames (ie there is no occlusion). The age 1310 and the activity count 1315 are always the same, so the ratio 1320 is constant at 1.0 which exceeds the ratio threshold of 0.85 at 1305. The object is considered stationary (see reference numeral 1325) when the age 1310 exceeds the age threshold 1300 at time 10.

Figure 13B:
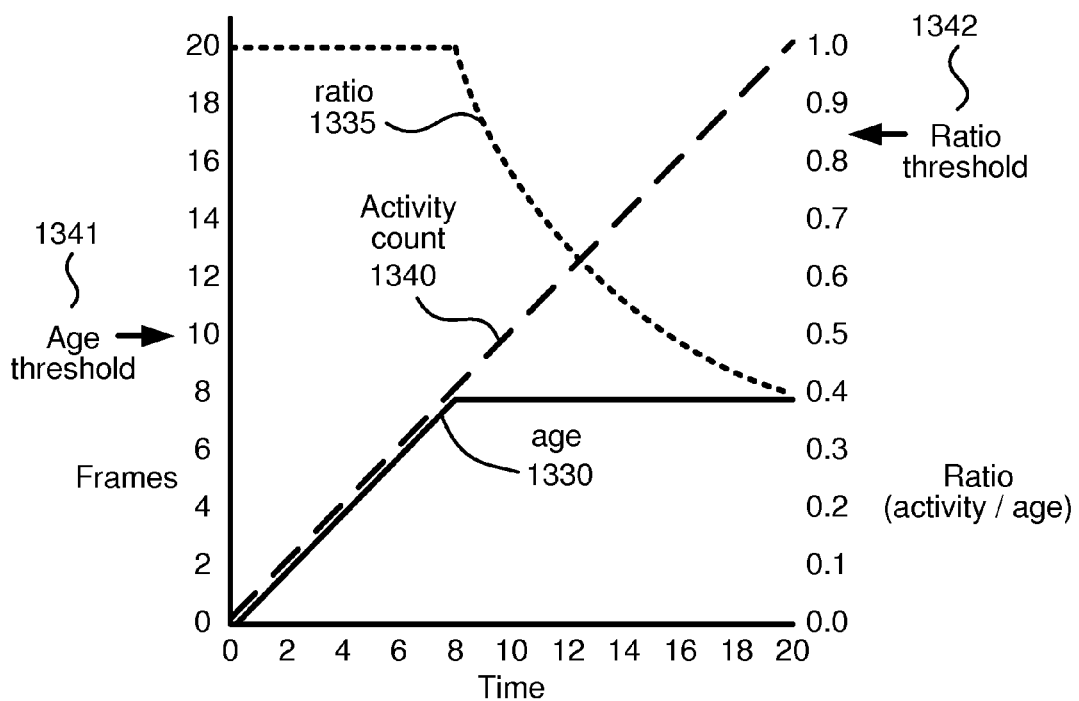

FIG. 13b shows a graph for an object that appears stationary until it disappears after 8 frames (see reference numeral 1330). In this case, the ratio 1335 drops below the ratio threshold 1342 and the age 1330 never exceeds the age threshold 1341 (set at 10 frames), so the object is never considered stationary.

Figure 13C:
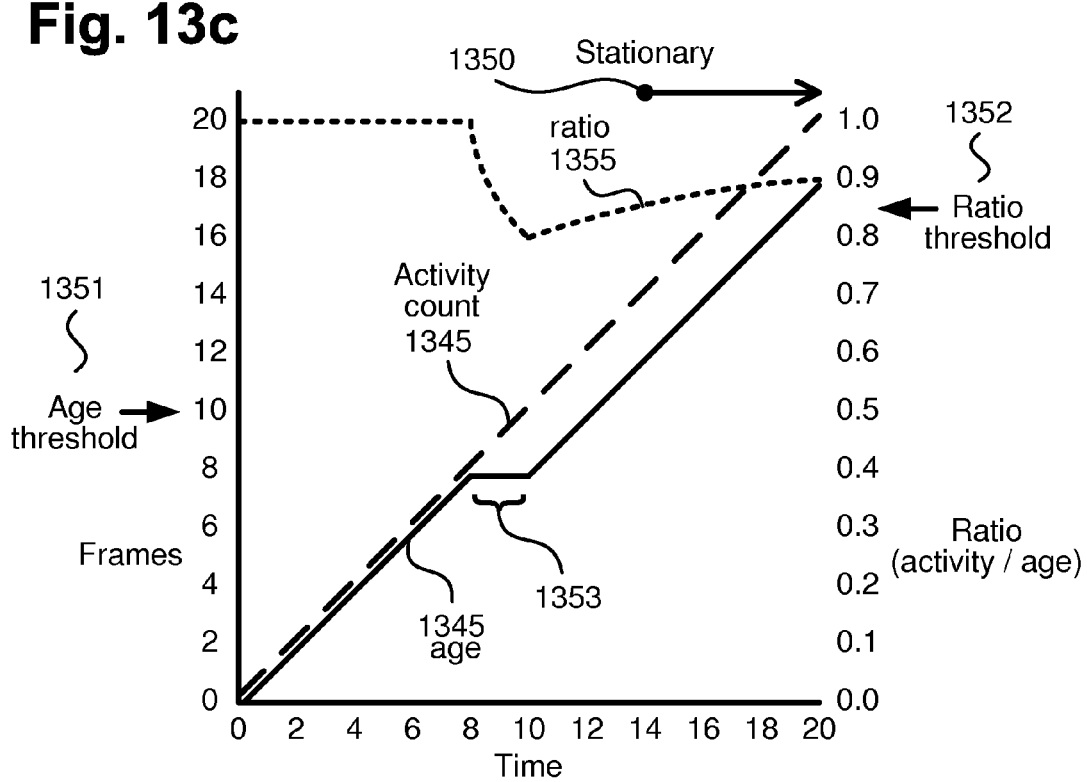

FIG. 13c shows a graph for an object that is occluded (see 1353) for frames 9 and 10, but appears the same before and after the occlusion. The object is considered stationary from time 14 (see reference numeral 1350), when the ratio 1355 exceeds the ratio threshold 1352 at which point the age threshold 1351 of 10 frames has already been exceeded.

Figure 13D:
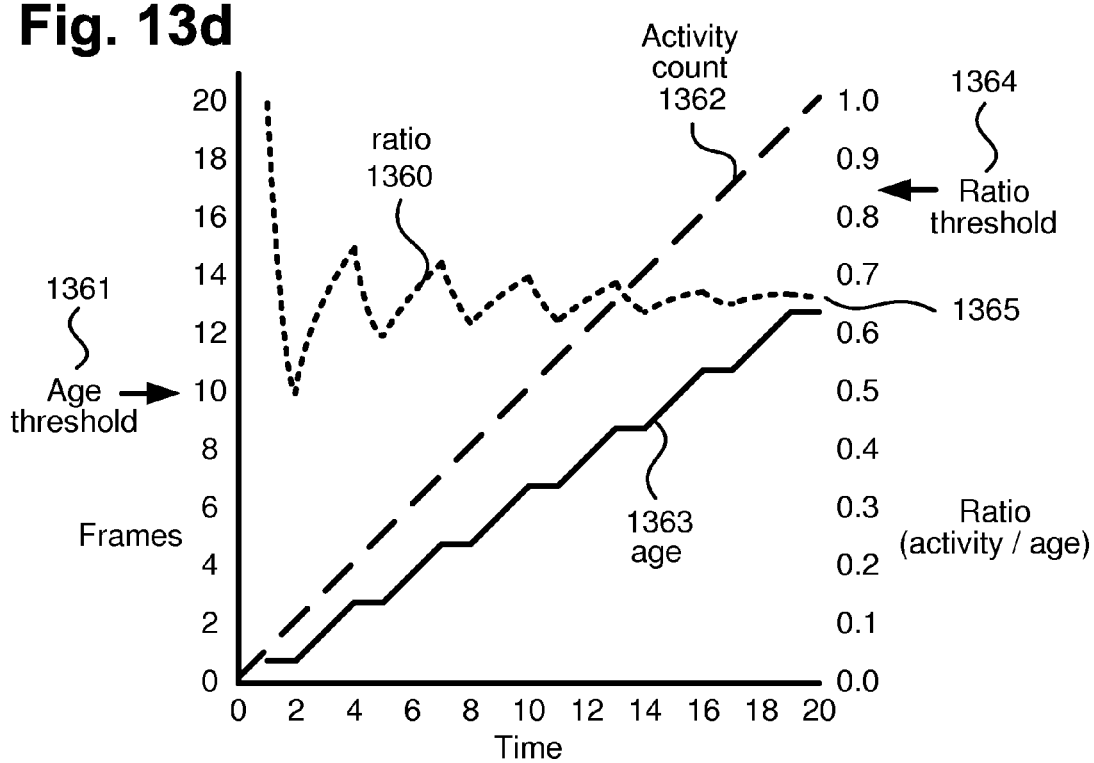

FIG. 13d shows a graph for an object that intermittently changes appearance; in particular, two out of every three frames match the associated modes. This could, for example, be a blinking light, or an area where a shadow is cast from elsewhere in the scene. The ratio 1360 quickly drops below the threshold 1364 of 0.85 and approaches 0.667 (see reference numeral 1365), so the object is never considered stationary.

INDUSTRIAL APPLICABILITY

It is apparent from the above that the arrangements described are applicable to the surveillance and data processing industries.

The foregoing describes only some embodiments of the present invention, and modifications and/or changes can be made thereto without departing from the scope and spirit of the invention, the embodiments being illustrative and not restrictive. Thus, for example, although the description has been directed to detection of stationary objects, the MMBM arrangements can be applied to a set of substantially contiguous visual elements which do not necessarily constitute an object (which is a set of connected visual elements).

The claims defining the invention are as follows:

1. A method of classifying a visual element in a video frame in a video stream as belonging to a foreground or a background, said frame comprising a plurality of visual elements, said method comprising the steps of:

receiving a set of candidate mode models associated with the visual element, each of the candidate mode models representing a time history of visual attributes of said each visual element;

determining a set of similarity scores between the input model and each of the set of candidate mode models in the corresponding visual element;

selecting matching mode models from the set of candidate mode models based on the determined similarity scores;

determining a representative activity count measure and a representative age measure from the matching mode model;

establishing a functional relationship between the representative activity count measure and the representative age measure;

comparing the functional relationship to a threshold value; and determining that the visual element is to be classified as belonging to the background based on the result of the comparing step.

2. A method according to claim 1, wherein the functional relationship between the representative activity count and the representative age measure is a ratio of the representative activity count measure to the representative age measure.

3. A method according to claim 1, wherein the representative age measure is the median of the ages of a plurality of the matching mode models.

4. A method according to claim 1, wherein the representative age measure is the arithmetic mean of the ages of the matching mode models.

5. A method according to claim 1, wherein the representative activity count measure is the median of the ages of the matching mode models.

6. A method according to claim 1, wherein the representative activity count measure is the arithmetic mean of the ages of the matching mode models.

7. A method according to claim 1, wherein a set of visual elements derived from the video stream is an object which is a connected component of adjacent visual elements.

8. A method according to claim 7, wherein the object is at least one of an abandoned object and a removed object.

9. An apparatus for classifying a visual element in a video frame in a video stream as belonging to a foreground or a background, said frame comprising a plurality of visual elements, said apparatus comprising:
 a processor; and
 a memory for storing a computer executable software program for directing the processor to perform a method for classifying a visual element in a video frame in a video stream as belonging to a foreground or a background, said frame comprising a plurality of visual elements, the method comprising the steps of:

receiving a set of candidate mode models associated with the visual element, each of the candidate mode models representing a time history of visual attributes of said each visual element;

determining a set of similarity scores between the input model and each of the set of candidate mode models in the corresponding visual element;

selecting matching mode models from the set of candidate mode models based on the determined similarity scores;

determining a representative activity count measure and a representative age measure from the matching mode models;

establishing a functional relationship between the representative activity count measure and the representative age measure;

comparing the functional relationship to a threshold value; and determining that the visual element is to be classified as belonging to the background based on the result of the comparing step.

10. A non-transitory computer readable storage medium having recorded thereon a computer program for directing a processor to execute a method for classifying a visual element in a video frame in a video stream as belonging to a foreground or a background, said frame comprising a plurality of visual elements, the program comprising:
 computer executable software code for receiving a set of candidate mode models associated with the visual element, each of the candidate mode models representing a time history of visual attributes of said each visual element;
 computer executable software code for determining a set of similarity scores between the input model and each of the set of candidate mode models in the corresponding visual element;
 computer executable software code for selecting matching mode models from the set of candidate mode models based on the determined similarity scores;
 computer executable software code for determining a representative activity count measure and a representative age measure from the matching mode models;
 computer executable software code for establishing a functional relationship between the representative activity count measure and the representative age measure;
 computer executable software code for comparing the functional relationship to a threshold value; and
 computer executable software code for determining that the visual element is to be classified as belonging to the background based on the result of the comparing step.

* * * * *